(12) United States Patent
Saori

(10) Patent No.: US 8,913,328 B2
(45) Date of Patent: Dec. 16, 2014

(54) FOUR GROUP ZOOM LENS SYSTEM

(75) Inventor: Masakazu Saori, Saitama (JP)

(73) Assignee: Pentax Ricoh Imaging Company, Ltd., Tokyo (JP)

(*) Notice: Subject to any disclaimer, the term of this patent is extended or adjusted under 35 U.S.C. 154(b) by 336 days.

(21) Appl. No.: 13/411,965

(22) Filed: Mar. 5, 2012

(65) Prior Publication Data

US 2012/0229689 A1    Sep. 13, 2012

(30) Foreign Application Priority Data

Mar. 10, 2011    (JP) .................. 2011-053401

(51) Int. Cl.
*G02B 15/16* (2006.01)
*G02B 15/173* (2006.01)

(52) U.S. Cl.
CPC .................. *G02B 15/173* (2013.01)
USPC .......................................... 359/687

(58) Field of Classification Search
CPC .. G02B 15/173; G02B 15/167; G02B 15/163; G02B 15/16
USPC .......................................... 359/687
See application file for complete search history.

(56) References Cited

U.S. PATENT DOCUMENTS

| | | | |
|---|---|---|---|
| 4,848,883 A | 7/1989 | Maruyama | |
| 7,864,445 B2 | 1/2011 | Shirasuna | |
| 8,031,411 B2* | 10/2011 | Ryu | 359/687 |
| 2002/0101661 A1 | 8/2002 | Harada | |

FOREIGN PATENT DOCUMENTS

| | | |
|---|---|---|
| JP | 63-188110 | 8/1988 |
| JP | 2000-284174 | 10/2000 |
| JP | 2002-006215 | 1/2002 |
| JP | 2002-162564 | 6/2002 |
| JP | 2008-070450 | 3/2008 |
| JP | 2009-288619 | 12/2009 |
| JP | 2010-152247 | 7/2010 |

OTHER PUBLICATIONS

Japan Office action, dated Aug. 26, 2014 along with an English translation thereof.

* cited by examiner

*Primary Examiner* — Zachary Wilkes
(74) *Attorney, Agent, or Firm* — Greenblum & Bernstein, P.L.C.

(57) ABSTRACT

A zoom lens system includes a positive first lens group, a negative second lens group, and positive third and fourth lens groups. Upon zooming from the short to long focal length extremities, the distance between the first and second lens groups increases and the distance between the second and third lens groups decreases. The first lens group includes a positive first sub-lens group which remains at a stationary position during focusing and a positive second sub-lens group which moves during focusing. Condition (1) is satisfied:

$$0.35 < f1b/f1a < 0.57 \qquad (1),$$

wherein $f1b$ and $f1a$ designate the focal length of the second and first sub-lens groups, respectively.

19 Claims, 26 Drawing Sheets

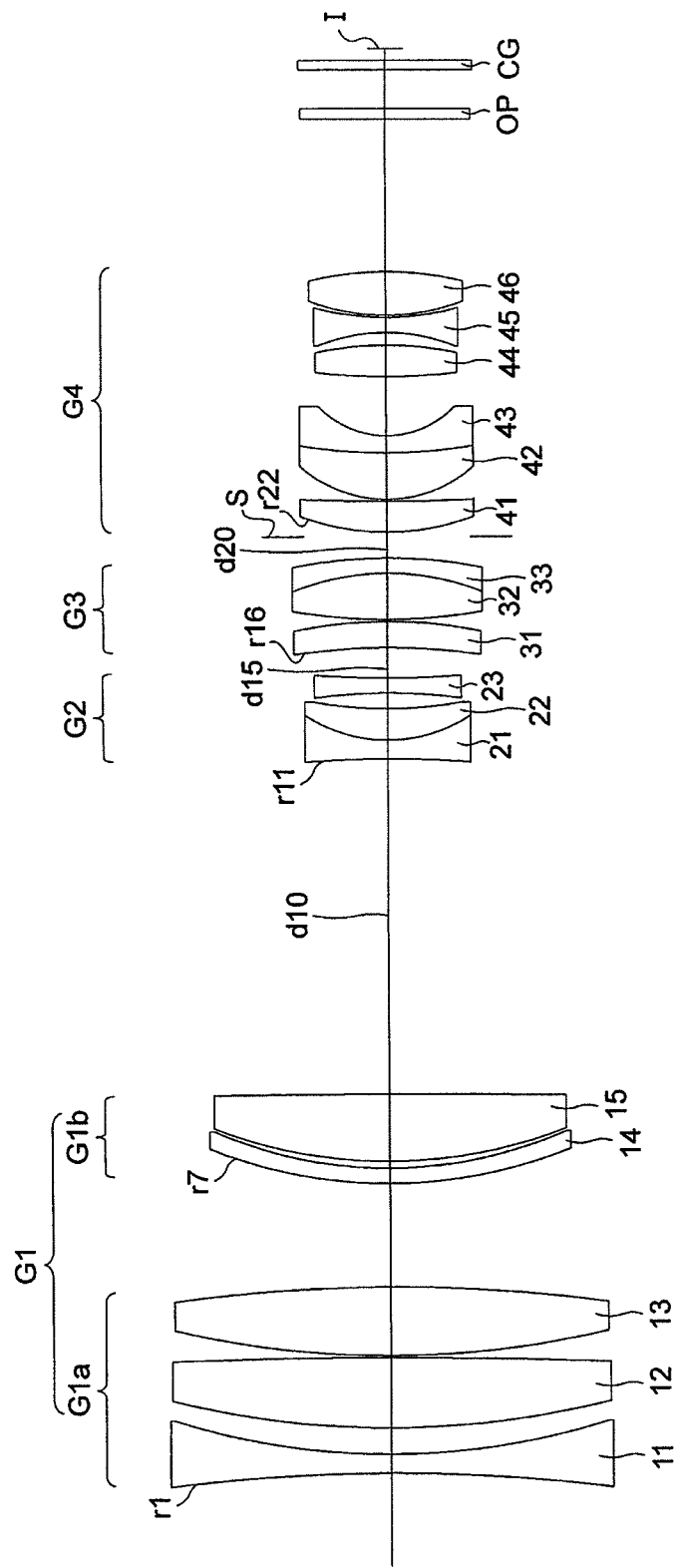

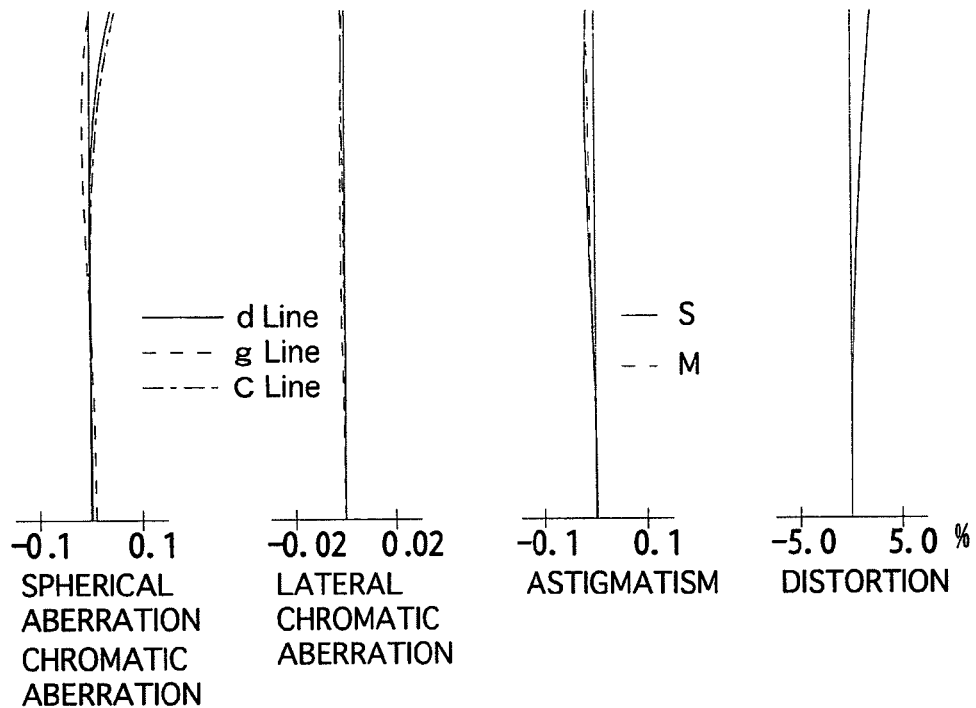
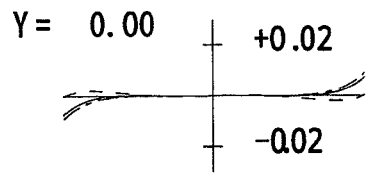
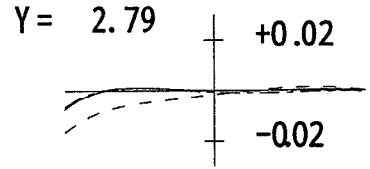
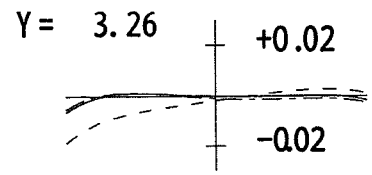
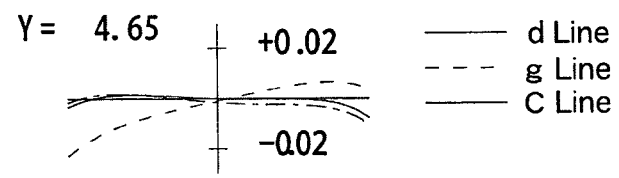

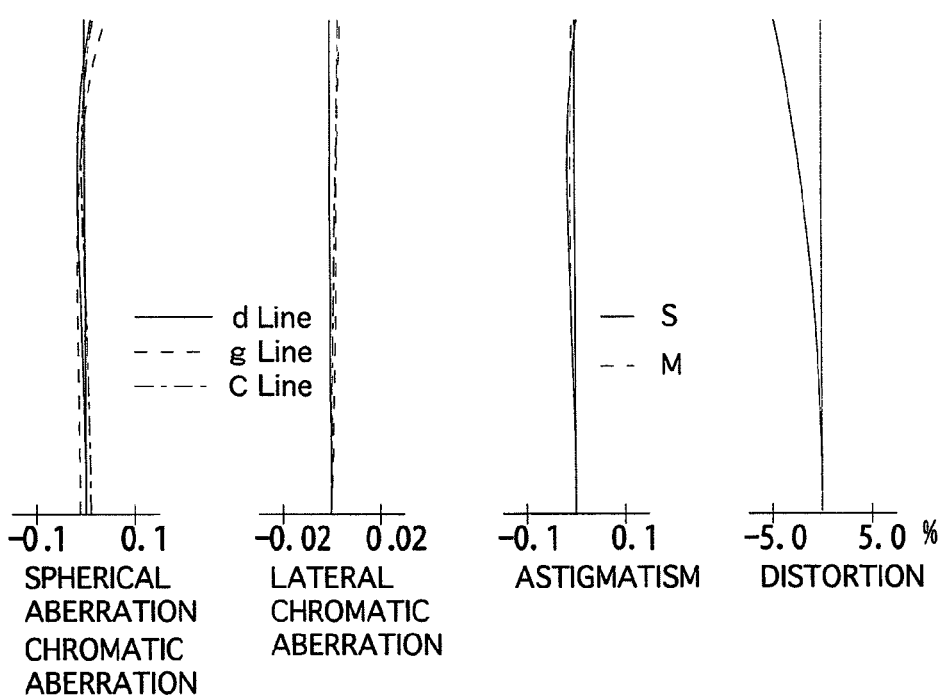
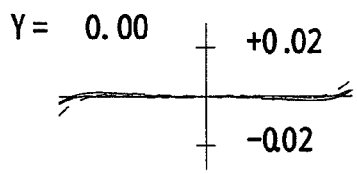
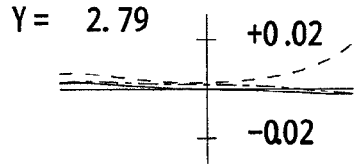
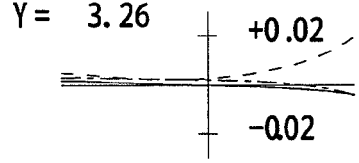
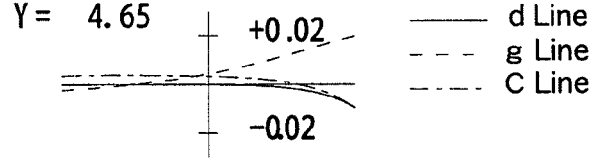

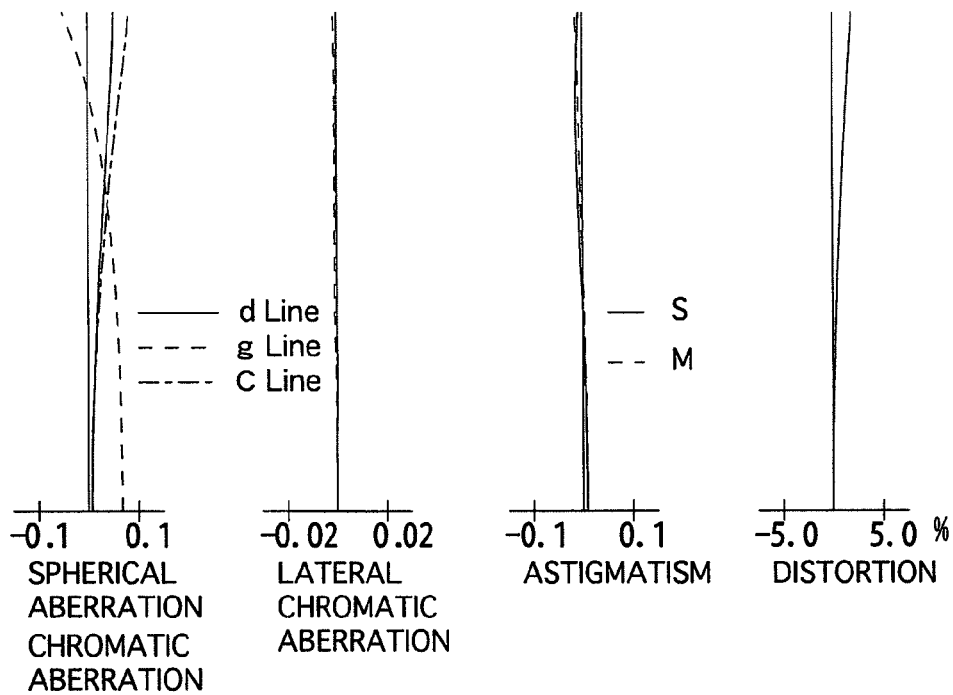
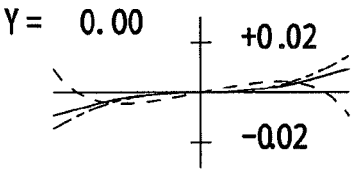
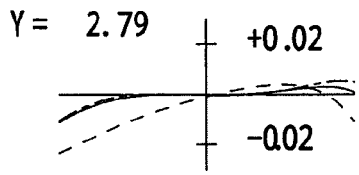
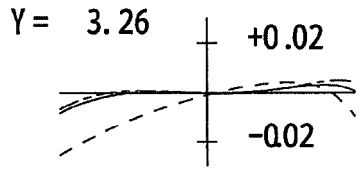
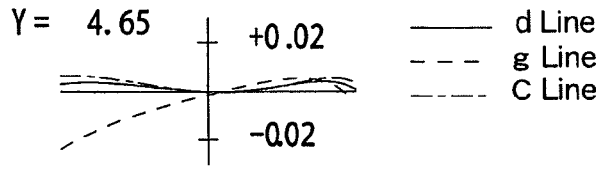

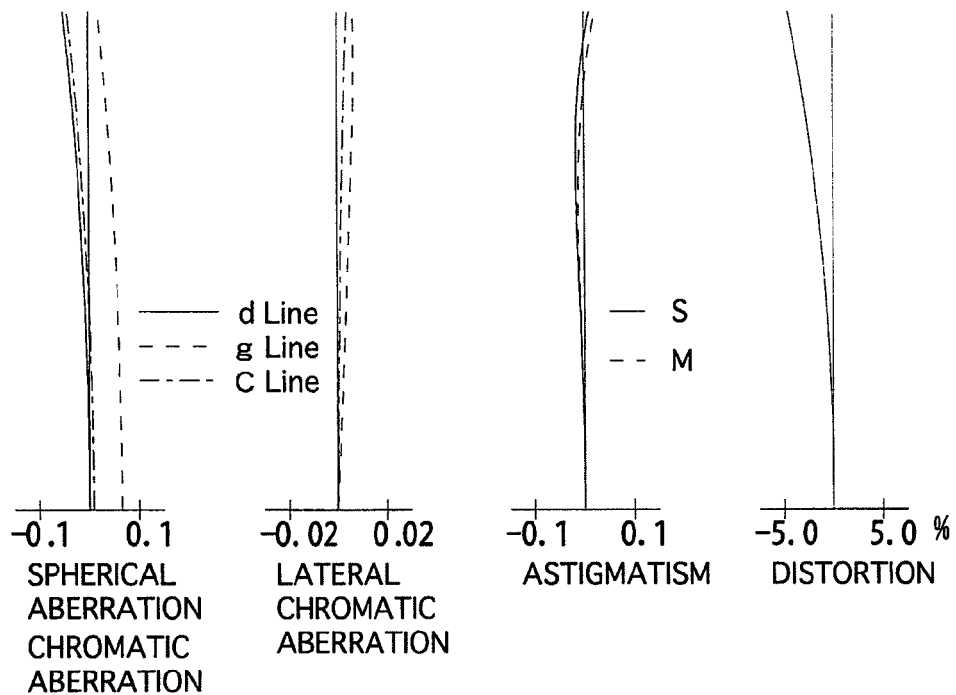
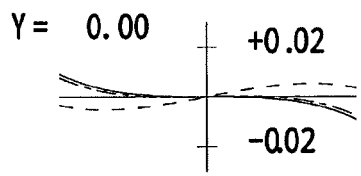
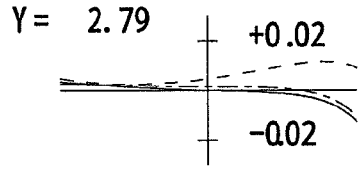
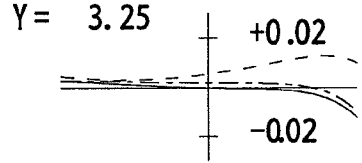
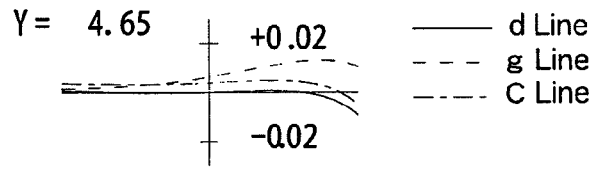

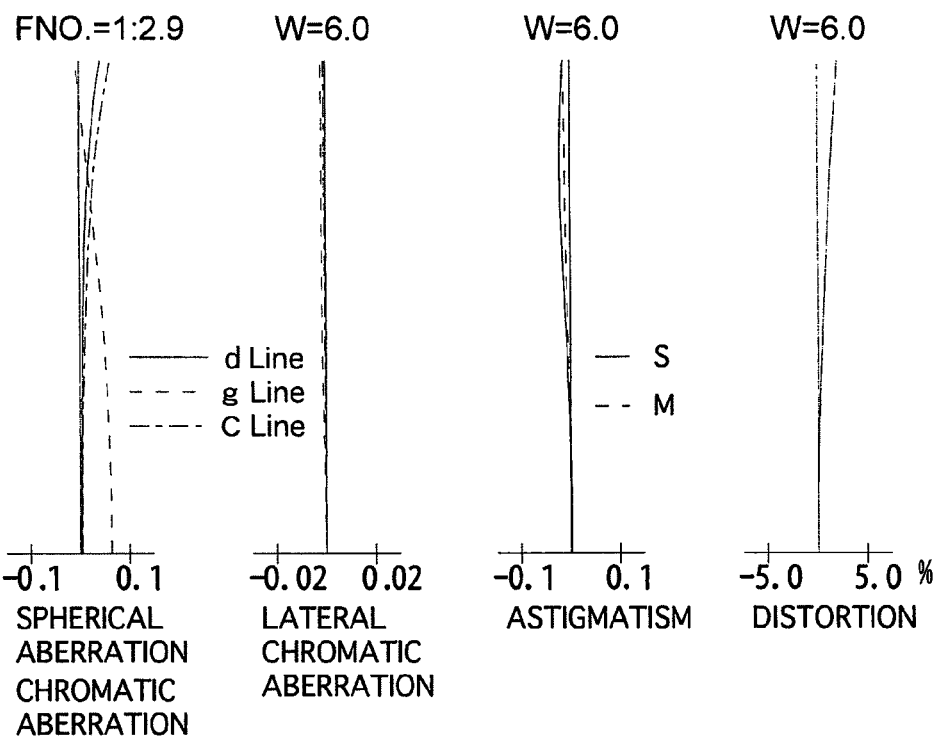
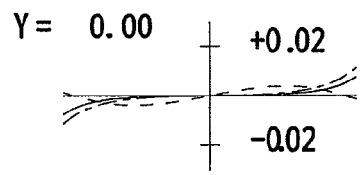
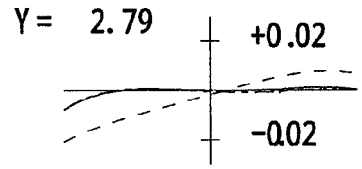
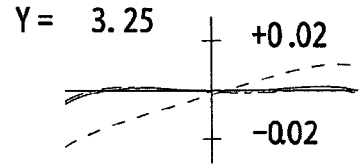
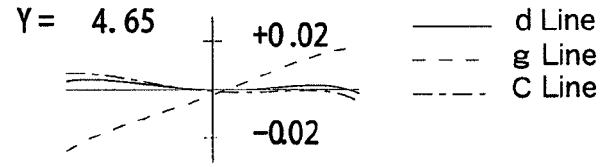

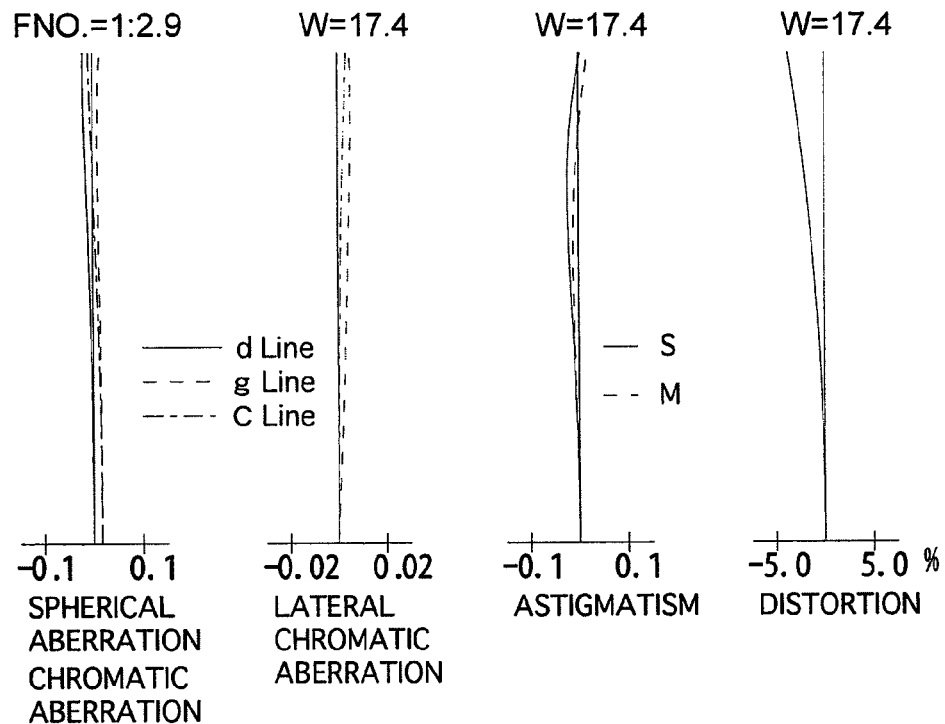
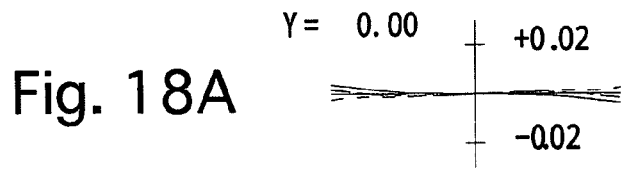
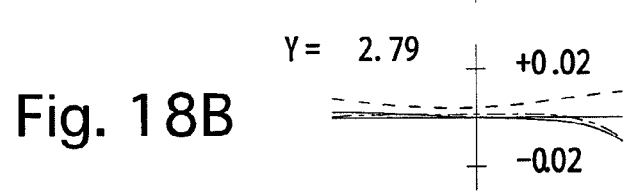
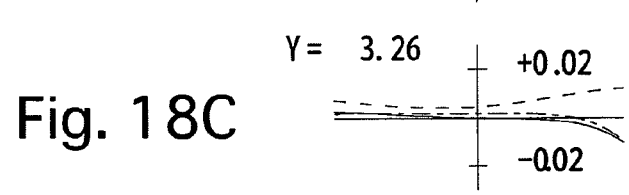
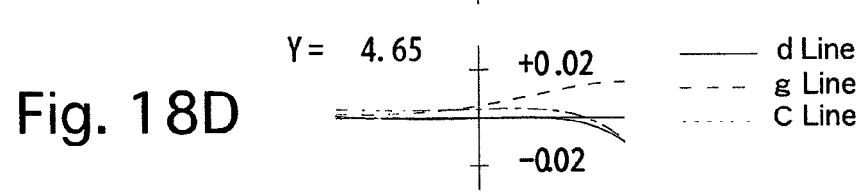

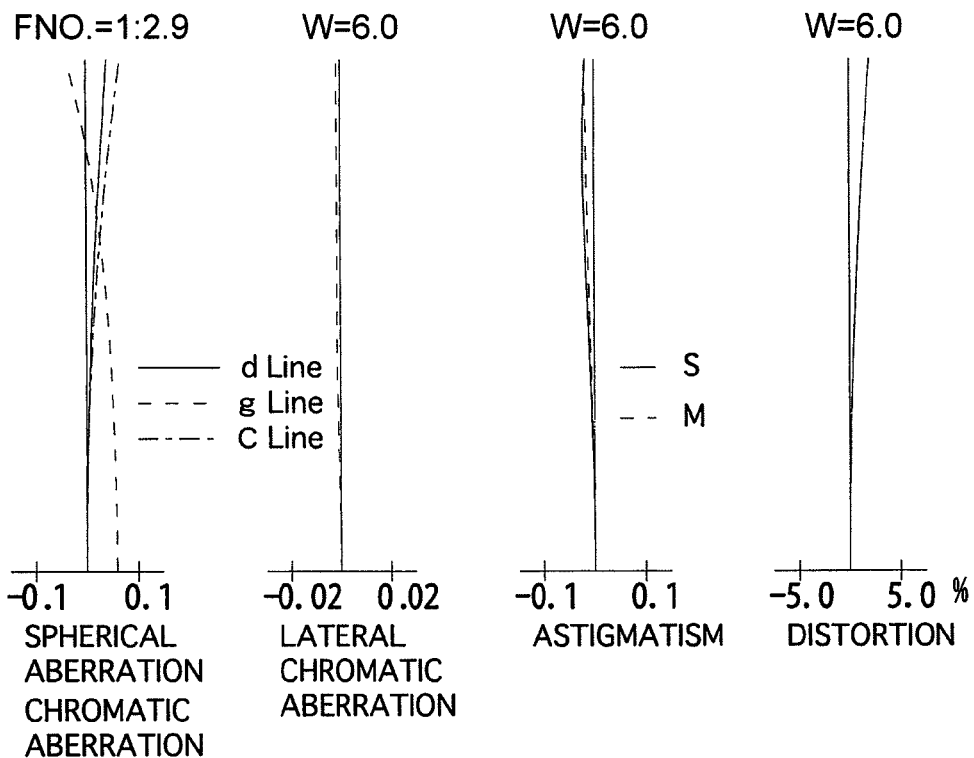
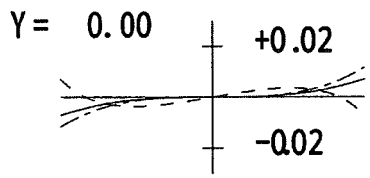
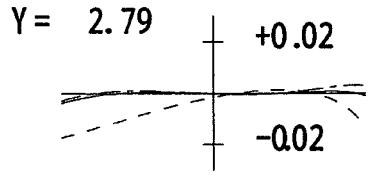
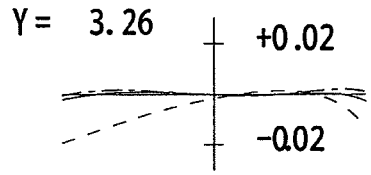
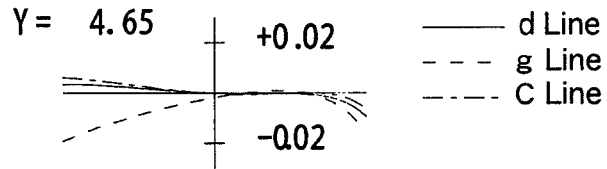

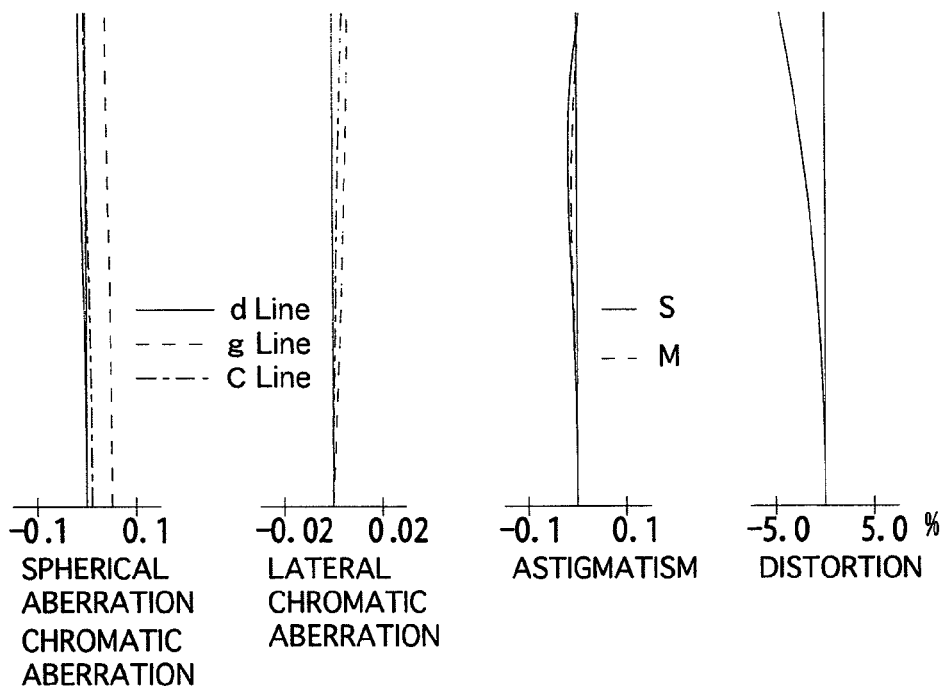
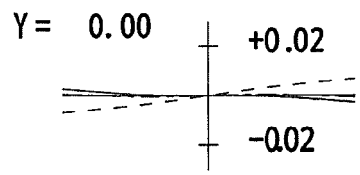
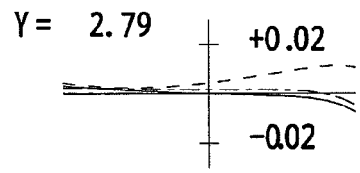
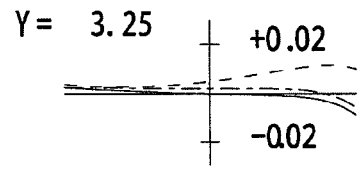
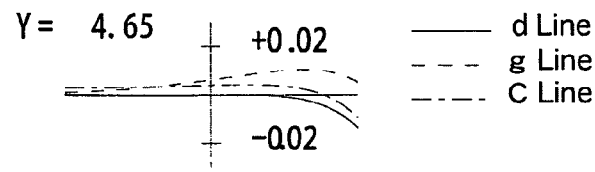

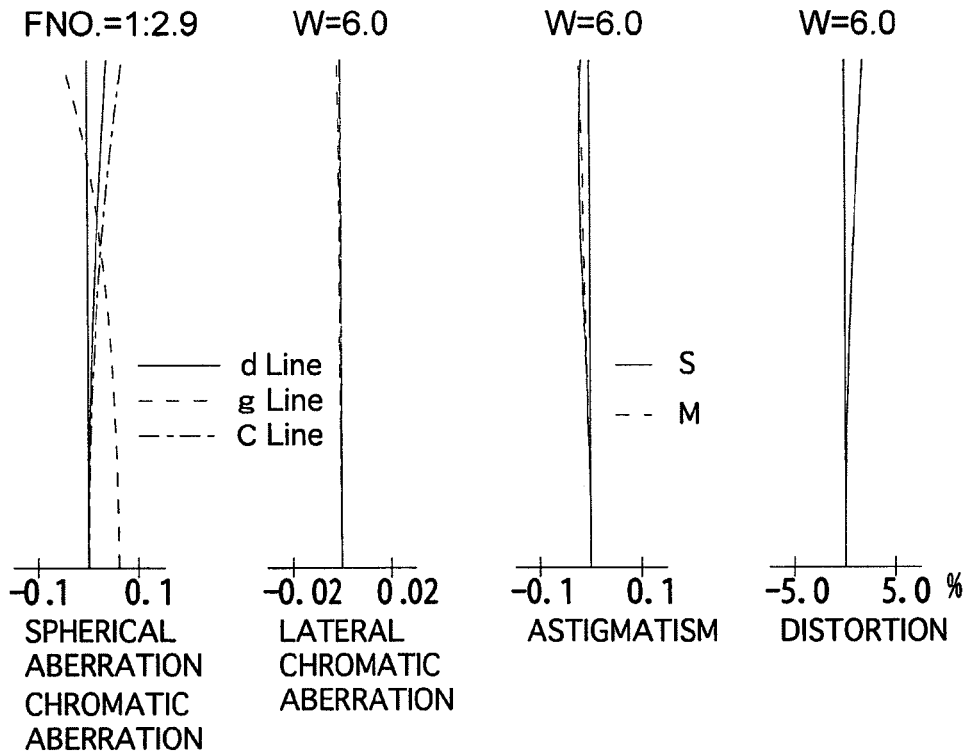
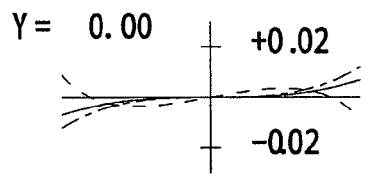
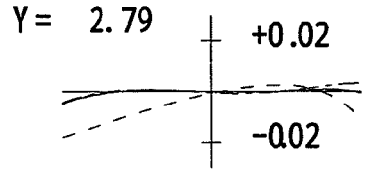
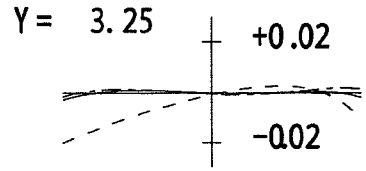
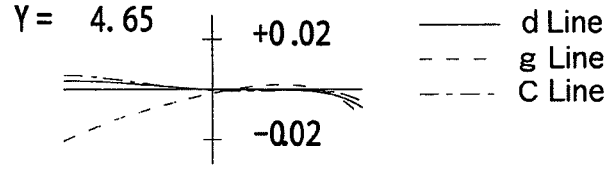

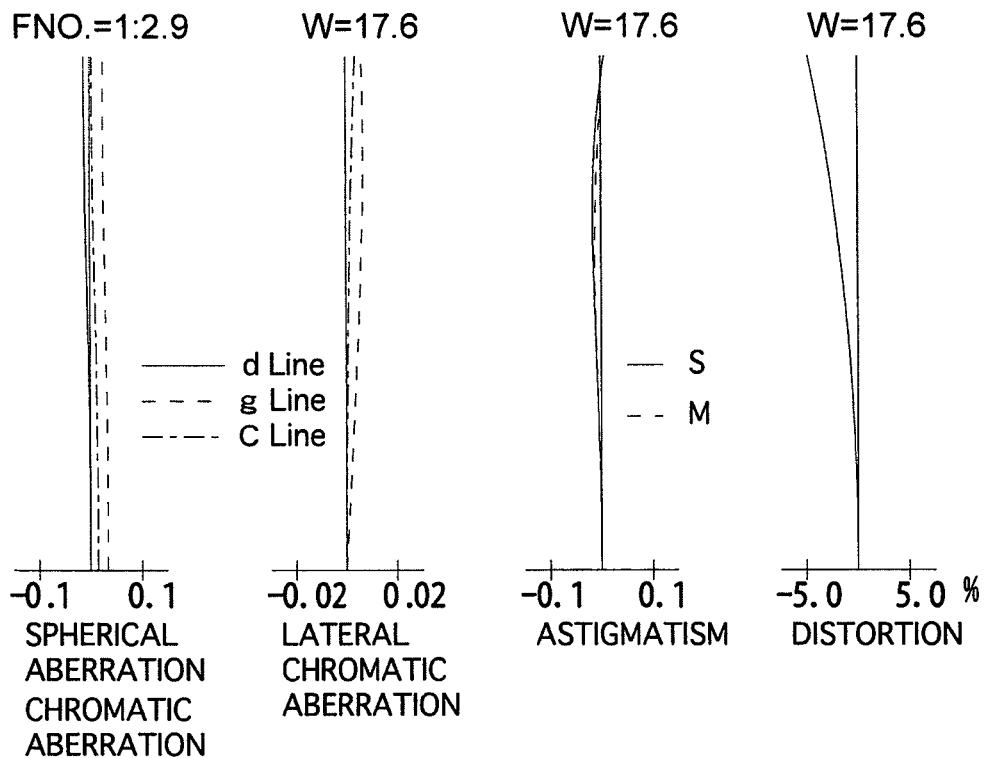
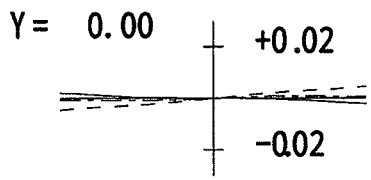
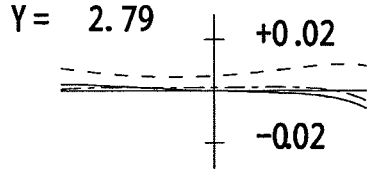
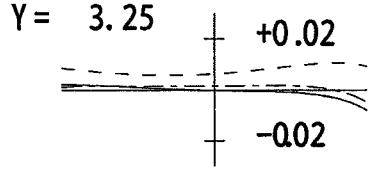
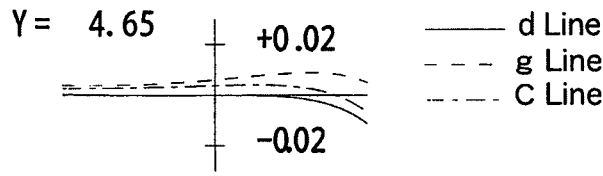

FOUR GROUP ZOOM LENS SYSTEM

BACKGROUND OF THE INVENTION

1. Field of the Invention

The present invention relates to a zoom lens system and an electronic imaging apparatus provided with a zoom lens system.

2. Description of Related Art

Zoom lens systems having four lens groups configured of a positive first lens group, a negative second lens group, a positive third lens group and a positive fourth lens group, in that order from the object side, are known in the art (e.g., Japanese Unexamined Patent Publication Nos. 2002-6215, 2008-70450 and 2002-162564) as zoom lens systems that aim to achieve further miniaturization and a higher optical quality.

Such zoom lens systems having four lens groups employ an internal focusing system which predominantly uses the second lens group to perform zooming, uses the third lens group to compensate for fluctuations in the imaging plane position that occur during zooming, and divides the first lens group into a front sub-lens group and a rear sub-lens group and performs focusing this rear sub-lens group. According to such a configuration, the length of the entire optical system (zoom lens system) does not change during zooming or during focusing operations, so that an optical system (zoom lens system) in which the f-number fluctuates minimally can be achieved.

However, in the zoom lens system taught in Japanese Unexamined Patent Publication No. 2002-6215, since the number of lens elements provided in each lens group (especially in the fourth lens group) are too few, fluctuation in lateral chromatic aberration increases during a focusing operation. Furthermore, in regard to the zoom lens system taught in Japanese Unexamined Patent Publication Nos. 2008-70450 and 2002-162564, since part of the fourth lens group is used as an image-blur correction lens group (image-stabilizing lens group) that is moved in a direction orthogonal to the optical axis, the number of lens elements thereof is large, complicating the configuration and increasing costs.

Furthermore, in each of the zoom lens systems taught in the above-mentioned Japanese Unexamined Patent Publication Nos. 2002-6215, 2008-70450 and 2002-162564, the refractive-power balance between the front sub-lens group and rear sub-lens group (focusing lens group) of the first lens group is inadequate. Accordingly, in the above-mentioned Japanese Unexamined Patent Publication Nos. 2002-6215 and 2008-70450, the refractive power of the rear sub-lens group (focusing lens group) of the first lens group becomes too strong, so that large amounts of various aberrations such as spherical aberration and astigmatism occur, especially at the long focal length extremity. Furthermore, in regard to the zoom lens system taught in above-mentioned Japanese Unexamined Patent Publication No. 2002-162564, the refractive power of the rear sub-lens group (focusing lens group) of the first lens group is too weak, so that due to the amount of movement of the focusing lens group being large, fluctuation in chromatic aberration increase during a focusing operation.

SUMMARY OF THE INVENTION

The present invention has been devised with consideration of the above described problems, and provides a zoom lens system in which the amount of movement of the focusing lens group is reduced so as to enable a rapid focusing operation, the structure thereof is simple and low-cost, and has superior optical quality; the present invention also provides an electronic imaging apparatus provided with such a zoom lens system.

According to an aspect of the present invention, a zoom lens system includes a positive first lens group, a negative second lens group, a positive third lens group, and a positive fourth lens group, in that order from the object side, wherein upon zooming from the short focal length extremity to the long focal length extremity, the distance between the first lens group and the second lens group increases, and the distance between the second lens group and the third lens group decreases. The first lens group includes a positive first sub-lens group which remains at a stationary position with respect to the optical axis direction during a focusing operation, and a positive second sub-lens group which moves in the optical axis direction during a focusing operation, in that order from the object side. The following condition (1) is satisfied:

$$0.35 < f1b/f1a < 0.57 \quad (1),$$

wherein f1b designates the focal length of the second sub-lens group, and f1a designates the focal length of the first sub-lens group.

It is desirable for the following condition (2) to be satisfied:

$$-4.4 < f1w/f2 < -3.2 \quad (2),$$

wherein f1w designates the focal length of the first lens group at the short focal length extremity when the zoom lens system is focused on an object at infinity, and f2 designates the focal length of the second lens group.

It is desirable for the following condition (3) to be satisfied:

$$2.15 < f1w/fw < 2.88 \quad (3),$$

wherein f1w designates the focal length of the first lens group at the short focal length extremity when the zoom lens system is focused on an object at infinity, and fw designates the focal length of the entire the zoom lens system at the short focal length extremity.

It is desirable for the following condition (4) to be satisfied:

$$-0.9 < f2/fw < -0.6 \quad (4),$$

wherein f2 designates the focal length of the second lens group, and fw designates the focal length of the entire the zoom lens system at the short focal length extremity.

It is desirable for the first lens group to include at least one positive lens element which satisfies the following condition (5):

$$91 < v1 \quad (5),$$

wherein v1 designates the Abbe number with respect to the d-line of the at least one positive lens element that is provided in the first lens group.

It is possible for the zoom lens system to configured so that the distance between the first sub-lens group and the second sub-lens group does not change upon zooming from the short focal length extremity to the long focal length extremity. In such a case, the zoom lens system is configured of a positive lens group, a negative lens group, a positive lens group and a positive lens group, in that order from the object side, i.e., four lens groups.

It is possible for the zoom lens system to configured so that the distance between the first sub-lens group and the second sub-lens group changes upon zooming from the short focal length extremity to the long focal length extremity. In such a case, the zoom lens system is configured of a positive lens group, a positive lens group, a negative lens group, a positive lens group and a positive lens group, in that order from the object side, i.e., five lens groups.

In an embodiment, an electronic imaging apparatus is provided, including the above-described zoom lens system.

According to the present invention, a zoom lens system can be achieved in which the amount of movement of the focusing lens group is reduced so as to enable a rapid focusing operation, the structure thereof is simple and low-cost, and has superior optical quality. An electronic imaging apparatus provided with such a zoom lens system can also be achieved.

The present disclosure relates to subject matter contained in Japanese Patent Application No. 2011-53401 (filed on Mar. 10, 2011) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a first numerical embodiment of a zoom lens system, according to the present invention, at the long focal length extremity when focused on an object at infinity;

FIGS. 2A, 2B, 2C and 2D show various aberrations that occurred in the lens arrangement of FIG. 1;

FIGS. 3A, 3B, 3C and 3D show lateral aberrations that occurred in the lens arrangement of FIG. 1;

FIGS. 5A, 5B, 5C and 5D show various aberrations that occurred in the lens arrangement of FIG. 4;

FIGS. 6A, 6B, 6C and 6D show lateral aberrations that occurred in the lens arrangement of FIG. 4;

FIGS. 8A, 8B, 8C and 8D show various aberrations that occurred in the lens arrangement of FIG. 7;

FIGS. 9A, 9B, 9C and 9D show lateral aberrations that occurred in the lens arrangement of FIG. 7;

FIGS. 11A, 11B, 11C and 11D show various aberrations that occurred in the lens arrangement of FIG. 10;

FIGS. 12A, 12B, 12C and 12D show lateral aberrations that occurred in the lens arrangement of FIG. 10;

FIGS. 14A, 14B, 14C and 14D show various aberrations that occurred in the lens arrangement of FIG. 13;

FIGS. 15A, 15B, 15C and 15D show lateral aberrations that occurred in the lens arrangement of FIG. 13;

FIGS. 17A, 17B, 17C and 17D show various aberrations that occurred in the lens arrangement of FIG. 16;

FIGS. 18A, 18B, 18C and 18D show lateral aberrations that occurred in the lens arrangement of FIG. 16;

FIGS. 20A, 20B, 20C and 20D show various aberrations that occurred in the lens arrangement of FIG. 19;

FIGS. 21A, 21B, 21C and 21D show lateral aberrations that occurred in the lens arrangement of FIG. 19;

FIGS. 23A, 23B, 23C and 23D show various aberrations that occurred in the lens arrangement of FIG. 22;

FIGS. 24A, 24B, 24C and 24D show lateral aberrations that occurred in the lens arrangement of FIG. 22;

FIGS. 32A, 32B, 32C and 32D show various aberrations that occurred in the lens arrangement of FIG. 31;

FIGS. 33A, 33B, 33C and 33D show lateral aberrations that occurred in the lens arrangement of FIG. 31;

FIGS. 35A, 35B, 35C and 35D show various aberrations that occurred in the lens arrangement of FIG. 34;

FIGS. 36A, 36B, 36C and 36D show lateral aberrations that occurred in the lens arrangement of FIG. 34;

DESCRIPTION OF THE EMBODIMENTS

Figure 37:
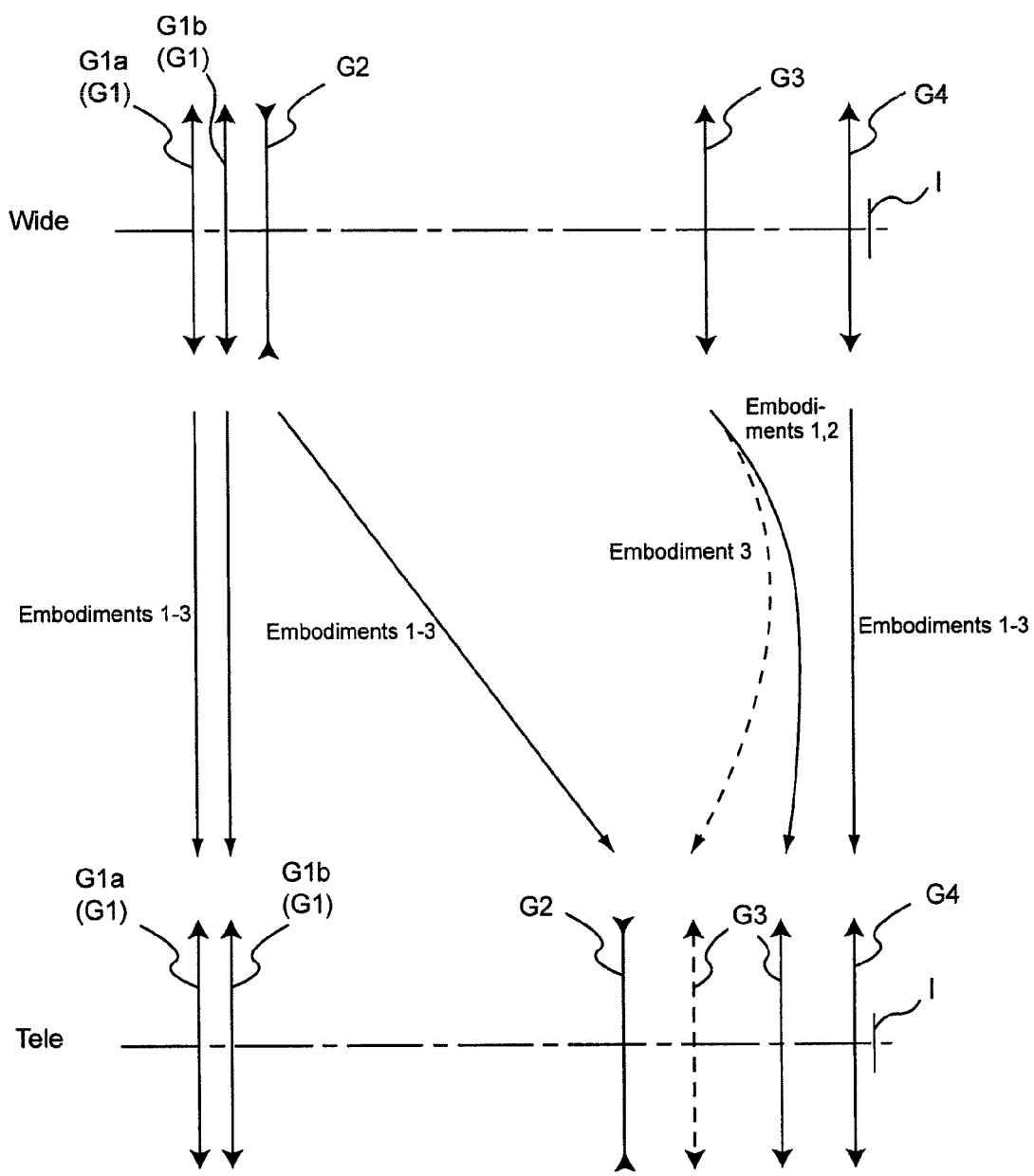
FIG. 37 shows a first zoom path of the zoom lens system according to the present invention.
Figure 38:
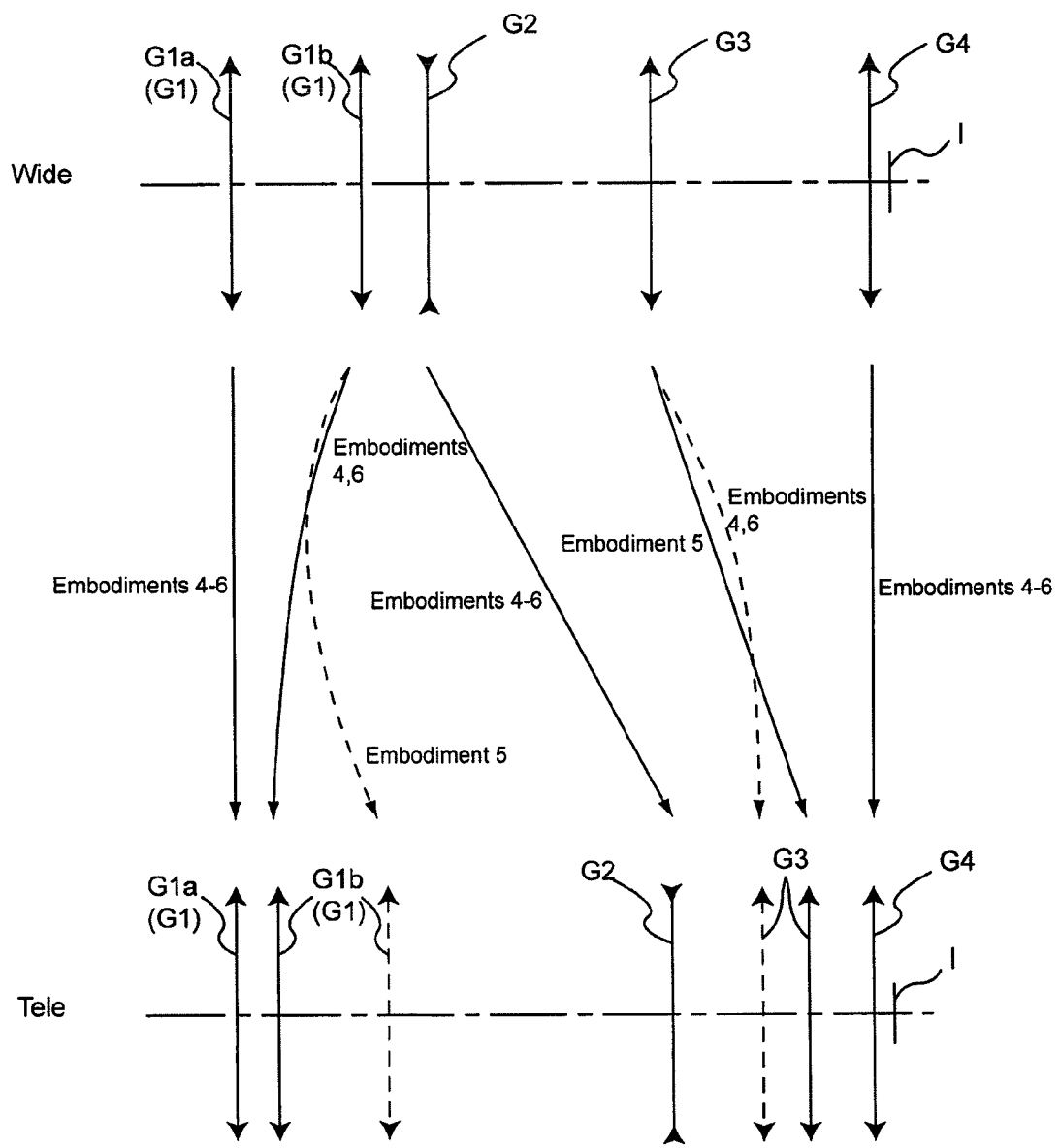
FIG. 38 shows a second zoom path of the zoom lens system according to the present invention.

The zoom lens system according to the present invention, as shown in the zoom paths of FIGS. 37 and 38, is configured of a positive first lens group G1, a negative second lens group G2, a positive third lens group G3 and a positive fourth lens group G4, in that order from the object side. The first lens group G1 is configured of a positive first sub-lens group G1*a* and a positive second sub-lens group G1*b*, in that order from the object side. "I" designates an imaging plane.

In each arrangement of the first through third numerical embodiments of the zoom lens system according to the present invention, as shown in the zoom path of FIG. 37, the first sub-lens group G1*a* and the second sub-lens group G1*b* of the first lens group G1 do not move relative to each other along the optical axis (so as to constitute a zoom lens system having four lens groups, i.e., a positive lens group, a negative lens group, a positive lens group and a positive lens group, in that order from the object side). In each arrangement of the fourth through sixth numerical embodiments, as shown in the zoom path of FIG. 38, the first sub-lens group G1a and the second sub-lens group G1b of the first lens group G1 move relative to each other along the optical axis (so as to constitute a zoom lens system having five lens groups, i.e., a positive lens group, a positive lens group, a negative lens group, a positive lens group and a positive lens group, in that order from the object side). In both of these arrangements, upon zooming from the short focal length extremity (WIDE) to the long focal length extremity (TELE), the distance between the first lens group G1 (the second sub-lens group G1b) and the second lens group G2 increases, and the distance between the second lens group G2 and the third lens group G3 decreases.

More specifically, in the first through third numerical embodiments as shown in the zoom path of FIG. 37, upon zooming from the short focal length extremity to the long focal length extremity, the first lens group G1 (the first sub-lens group G1a and the second sub-lens group G1b) remains stationary with respect to the imaging plane I. In the first through third numerical embodiments, upon zooming from the short focal length extremity to the long focal length extremity, the second lens group G2 monotonically moves toward the image side. In the first and second numerical embodiments, upon zooming from the short focal length extremity to the long focal length extremity, the third lens group G3 first moves toward the image side and thereafter moves slightly toward the object side (so as to move toward the image side overall), and in the third numerical embodiment, the third lens group G3 first moves toward the image side and thereafter moves back toward the object side to exceed the short focal length extremity position thereof (so as to move toward the object side overall). In the first through third numerical embodiments, upon zooming from the short focal length extremity to the long focal length extremity, the fourth lens group G4 remains stationary with respect to the imaging plane I.

In the fourth through sixth numerical embodiments as shown in the zoom path of FIG. 38, upon zooming from the short focal length extremity to the long focal length extremity, the first sub-lens group G1a remains stationary with respect to the imaging plane I. In the fourth and sixth numerical embodiments, upon zooming from the short focal length extremity to the long focal length extremity, the second sub-lens group G1b moves toward the object side, and in the fifth numerical embodiment, the second sub-lens group G1b first moves toward the object side and thereafter moves back toward the image side to exceed the short focal length extremity position thereof (so as to move toward the image side overall). In the fourth through sixth numerical embodiments, upon zooming from the short focal length extremity to the long focal length extremity, the second lens group G2 moves monotonically toward the image side. In the fourth and sixth numerical embodiments, upon zooming from the short focal length extremity to the long focal length extremity, the third lens group G3 first moves toward to the image side and thereafter moves slightly toward the object side (so as to move toward the image side overall), and in the fifth numerical embodiment, the third lens group G3 monotonically moves toward the image side. In the fourth through sixth numerical embodiments, upon zooming from the short focal length extremity to the long focal length extremity, the fourth lens group G4 remains stationary with respect to the imaging plane I.

In each of the first through sixth numerical embodiments, the first sub-lens group G1a is configured of three lens elements, i.e., a negative lens element 11, a positive lens element 12, and a positive lens element 13, in that order from the object side. In the second, fourth and sixth numerical embodiments, the negative lens element 11 and the positive lens element 12 are cemented to each other. The position of the first sub-lens group G1a on the optical axis is stationary (the distance between the first sub-lens group G1a and the imaging plane I remains constant) during a focusing operation.

In the first numerical embodiment, the second sub-lens group G1b is configured of two lens elements, i.e., a negative lens element 14 and a positive lens element 15, in that order from the object side. In the second through sixth numerical embodiments, the second sub-lens group G1b is configured of a single positive lens element 16. The second sub-lens group G1b is a focusing lens group which is moved along the optical axis direction during a focusing operation (the second sub-lens group G1b is moved toward the object side when focusing on an object at infinity through to an object at a finite distance).

In the first, second, fourth and sixth numerical embodiments, the second lens group G2 is configured of three lens elements, i.e., a cemented lens formed from a negative lens element 21 and a positive lens element 22; and a negative lens element 23, in that order from the object side. In the third and fifth numerical embodiments, the second lens group G2 is configured of four lens elements, i.e., a negative lens element 24, a cemented lens formed from a negative lens element 25 and a positive lens element 26; and a negative lens element 27, in that order from the object side.

In each of the first through sixth numerical embodiments, the third lens group G3 is configured of three lens elements, i.e., a positive lens element 31, and a cemented lens formed from a positive lens element 32 and a negative lens element 33, in that order from the object side.

In each of the first through sixth numerical embodiments, the fourth lens group G4 is configured of six lens elements, i.e., a positive lens element 41, a cemented lens formed from a positive lens element 42 and a negative lens element 43; a positive lens element 44, a negative lens element 45, and a positive lens element 46, in that order from the object side.

The zoom lens system of the present invention is an internal focusing system in which the first lens group G1 is divided into two sub-lens groups, i.e., the first sub-lens group G1a and the second sub-lens group G1b, so that the first sub-lens group G1a serves as a stationary lens group that remains at a stationary position on the optical axis (at a constant distance from the imaging plane I) during zooming and focusing operations, and the second sub-lens group G1b serves as a focusing lens group which is moved in the optical axis direction during a focusing operation. According to this configuration, the overall length of the optical system (zoom lens system) does not change during zooming and focusing operations, and achieves a zoom lens system with minimal change in the f-number.

Furthermore, according to the present invention, the refractive power of the second sub-lens group (focusing lens group) G1b that has been divided from the first lens group G1 is specified within a predetermined optimum range that satisfies condition (1). By satisfying condition (1), the amount of movement of the second sub-lens group (focusing lens group) G1b during a focusing operation can be reduced while enabling a rapid focusing operation; and hence, chromatic aberration fluctuations during a focusing operation can be reduced. Furthermore, occurrence of various aberrations at the long focal length extremity such as spherical aberration and astigmatism, etc.

Specifically, condition (1) specifies the ratio of the focal length of the second sub-lens group (focusing lens group) G1*b* to the focal length of the first sub-lens group G1*a*.

If the upper limit of condition (1) is exceeded, the refractive power of the second sub-lens group (focusing lens group) G1*b* becomes too weak, so that the amount of movement of the focusing lens group during a focusing operation increases, resulting in an increase in chromatic aberration during a focusing operation.

If the lower limit of condition (1) is exceeded, the optical power of the second sub-lens group (focusing lens group) G1*b* becomes strong so that, although the amount of movement of the second sub-lens group (focusing lens group) G1*b* during a focusing operation can be reduced while enabling a rapid focusing operation, large amounts of various aberrations such as spherical aberration and astigmatism, etc., occur especially at the long focal length extremity.

Condition (2) specifies the ratio of the focal length of the first lens group G1 when focusing on an object at infinity at the short focal length extremity to the focal length of the second lens group G2. By satisfying condition (2), occurrence of various aberrations such as spherical aberration and astigmatism, etc., can be suppressed over the entire zooming range.

If the upper limit of condition (2) is exceeded, the refractive power of the first lens group G1 becomes too strong, so that various aberrations such as spherical aberration and astigmatism, etc., occur in large amounts, especially at the long focal length extremity.

If the lower limit of condition (2) is exceeded, the refractive power of the second lens group G2 becomes strong, which although is advantageous for miniaturization of the zoom lens system, a large amount of astigmatism occurs at the short focal length extremity.

Condition (3) specifies the ratio of the focal length of the first lens group G1 when focusing on an object at infinity at the short focal length extremity to the focal length of the entire zoom lens system at the short focal length extremity. By satisfying condition (3), the zoom lens system can be miniaturized while various aberrations such as spherical aberration and astigmatism, etc., can be suppressed.

If the upper limit of condition (3) is exceeded, the zoom lens system becomes enlarged and correction of astigmatism becomes insufficient.

If the lower limit of condition (3) is exceeded, the refractive power of the first lens group G1 becomes strong, which although is advantageous for miniaturization of the zoom lens system, various aberrations such as spherical aberration and coma occur in large amounts.

Condition (4) specifies the ratio of the focal length of the second lens group G2 to the focal length of the entire zoom lens system at the short focal length extremity. By satisfying condition (4), the zoom lens system can be miniaturized while suppressing the occurrence of various aberrations such as spherical aberration and astigmatism, etc., over the entire zooming range.

If the upper limit of condition (4) is exceeded, the refractive power of the second lens group G2 becomes too strong, so that a large amount of astigmatism occurs. Furthermore, although a strong refractive power of the second lens group G2 is advantageous for miniaturization of the zoom lens system, aberration fluctuations during zooming increase, so that it becomes difficult to correct aberrations in a well balanced manner over the entire zooming range.

If the lower limit of condition (4) is exceeded, the refractive power of the second lens group G2 becomes too weak, so as to be disadvantageous for miniaturization of the zoom lens system and correction of spherical aberration remains insufficient.

In the third and sixth numerical embodiments, the positive lens element 12 of the first lens group G1 is formed using a low-dispersion lens material (such as fluorite lens material), the Abbe number with respect to the d-line thereof satisfying condition (5). By including at least one positive lens element which satisfies condition (5) into the first lens group G1, axial chromatic aberration and lateral chromatic aberration can be more favorably corrected.

Specific numerical embodiments (first through sixth numerical embodiments) will be herein discussed. In the various aberration diagrams, lateral aberration diagrams and the tables, the d-line, g-line and C-line show aberrations at their respective wave-lengths; S designates the sagittal image, M designates the meridional image, FNO. designates the f-number, f designates the focal length of the entire optical system, W designates the half angle of view) (°), Y designates the image height, fB designates the backfocus, L designates the overall length of the lens system, r designates the radius of curvature, d designates the lens thickness or distance between lenses, N(d) designates the refractive index at the d-line, and νd designates the Abbe number with respect to the d-line. The unit used for the various lengths is defined in millimeters (mm). The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity. No aspherical lens elements are used in any of the first through sixth embodiments.

Numerical Embodiment 1

Figure 4:
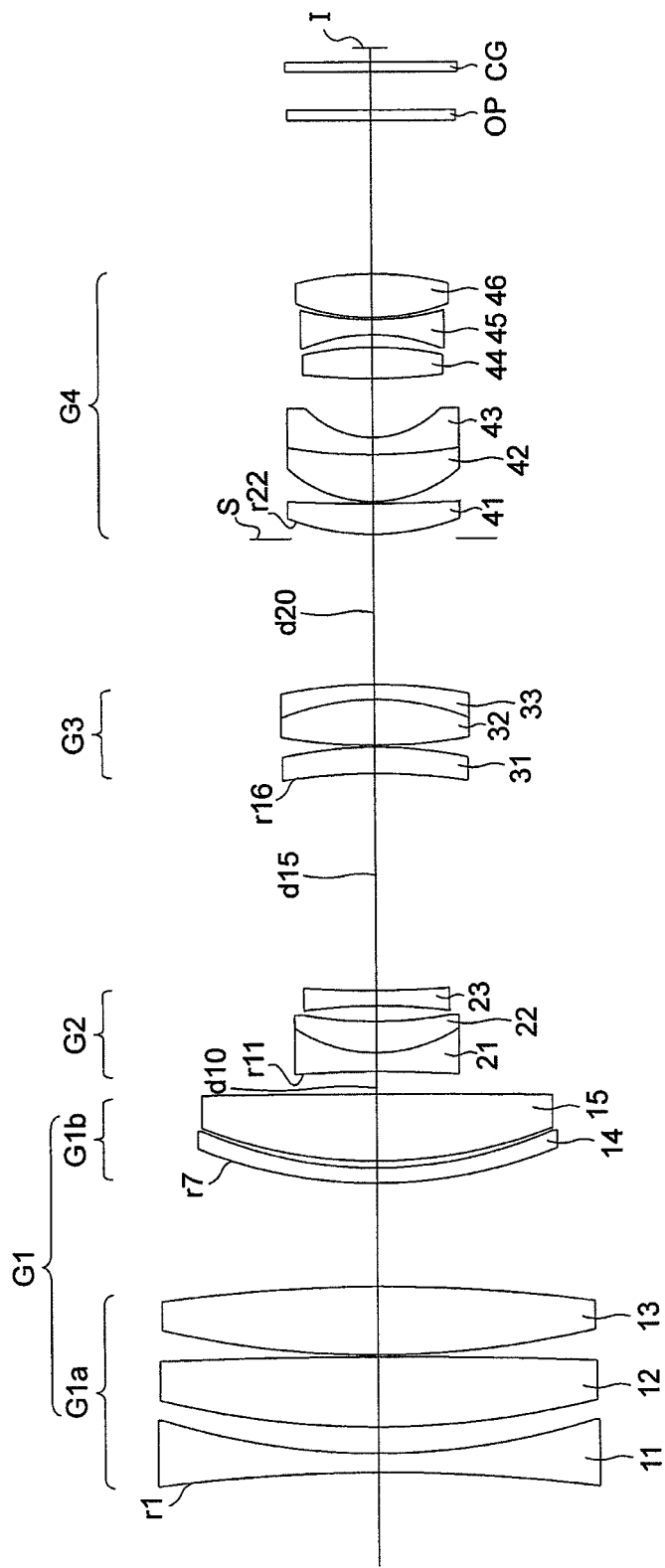
FIG. 4 shows a lens arrangement of the first numerical embodiment of the zoom lens system, according to the present invention, at the short focal length extremity when focused on an object at infinity.

FIGS. 1 through 6D and Tables 1 through 3 show a first numerical embodiment of the zoom lens system according to the present invention. FIG. 1 shows a lens arrangement of the first numerical embodiment of the zoom lens system when focusing on an object at infinity at the long focal length extremity. FIGS. 2A, 2B, 2C and 2D show various aberrations that occurred in the lens arrangement shown in FIG. 1. FIGS. 3A, 3B, 3C and 3D show lateral aberrations that occurred in the lens arrangement shown in FIG. 1. FIG. 4 shows a lens arrangement of the first numerical embodiment of the zoom lens system when focusing on an object at infinity at the short focal length extremity. FIGS. 5A, 5B, 5C and 5D show various aberrations that occurred in the lens arrangement shown in FIG. 4. FIGS. 6A, 6B, 6C and 6D show lateral aberrations that occurred in the lens arrangement shown in FIG. 4. Table 1 shows the lens surface data, Table 2 shows various zoom lens system data, and Table 3 shows the lens group data of the zoom lens system according to the first numerical embodiment.

The zoom lens system of the first numerical embodiment is configured of a positive first lens group G1, a negative second lens group G2, a positive third lens group G3 and a positive fourth lens group G4, in that order from the object side. An optical filter OP and a cover glass CG are provided behind the fourth lens group G4 (between the fourth lens group G4 and the imaging plane I).

The first lens group G1 is configured of a positive first sub-lens group G1a and a positive second sub-lens group G1b, in that order from the object side.

The first sub-lens group G1a is configured of a biconcave negative lens element 11, a biconvex positive lens element 12, and a biconvex positive lens element 13, in that order from the object side. The first sub-lens group G1a remains at a stationary position on the optical axis (the distance between the first sub-lens group G1a and the imaging plane I remains constant) during a focusing operation.

The second sub-lens group G1b is configured of a negative meniscus lens element 14 having a convex surface on the object side, and a biconvex positive lens element 15, in that order from the object side. The second sub-lens group G1b serves as a focusing lens group which moves in the optical axis direction during a focusing operation (the second sub-lens group G1b moves toward the object side when focusing from an object at infinity to an object at a finite distance).

The second lens group G2 is configured of a cemented lens formed from a biconcave negative lens element 21 and a positive meniscus lens element 22 having a convex surface on the object side; and a biconcave negative lens element 23, in that order from the object side.

The third lens group G3 is configured of a positive meniscus lens element having a convex surface on the image side; and a cemented lens formed from a biconvex positive lens element 32 and a negative meniscus lens element 33 having a convex surface on the image side, in that order from the object side.

The fourth lens group G4 is configured of a positive meniscus lens element 41 having a convex surface on the object side; a cemented lens formed from a positive meniscus lens element 42 having a convex surface on the object side and a negative meniscus lens element 43 having a convex surface on the object side; a biconvex positive lens element 44, a biconcave negative lens element 45, and a biconvex positive lens element 46, in that order from the object side.

A diaphragm S which is provided between the third lens group G3 and the fourth lens group G4 is stationary with respect to the imaging plane I together with the fourth lens group G4.

TABLE 1

SURFACE DATA

| Surf. No. | r | d | N(d) | vd |
|---|---|---|---|---|
| 1 | −93.915 | 1.00 | 1.61659 | 36.6 |
| 2 | 37.787 | 1.42 | | |
| 3 | 47.037 | 3.80 | 1.49700 | 81.6 |
| 4 | −312.628 | 0.10 | | |
| 5 | 51.134 | 3.61 | 1.49700 | 81.6 |
| 6 | −86.241 | d6 | | |
| 7 | 26.081 | 0.80 | 1.51742 | 52.4 |
| 8 | 23.494 | 0.36 | | |
| 9 | 26.040 | 3.54 | 1.48749 | 70.4 |
| 10 | −620.236 | d10 | | |
| 11 | −64.700 | 1.00 | 1.77250 | 49.6 |
| 12 | 8.023 | 1.66 | 1.84666 | 23.8 |
| 13 | 22.294 | 0.83 | | |
| 14 | −29.302 | 0.80 | 1.80420 | 46.5 |
| 15 | 51.853 | d15 | | |
| 16 | −32.988 | 1.39 | 1.72916 | 54.7 |
| 17 | −24.078 | 0.10 | | |
| 18 | 29.622 | 2.42 | 1.49700 | 81.6 |
| 19 | −13.660 | 0.80 | 1.83400 | 37.3 |
| 20 | −25.664 | d20 | | |
| 21 | ∞ | 0.24 | | |
| (Diaphragm) | | | | |
| 22 | 13.166 | 1.61 | 1.49700 | 81.6 |

TABLE 1-continued

SURFACE DATA

| Surf. No. | r | d | N(d) | vd |
|---|---|---|---|---|
| 23 | 100.405 | 0.10 | | |
| 24 | 6.963 | 2.46 | 1.61800 | 63.4 |
| 25 | 28.602 | 0.90 | 1.60342 | 38.0 |
| 26 | 5.053 | 3.10 | | |
| 27 | 31.764 | 1.65 | 1.78470 | 26.1 |
| 28 | −17.827 | 0.66 | | |
| 29 | −9.799 | 0.80 | 1.80610 | 33.3 |
| 30 | 15.117 | 0.10 | | |
| 31 | 11.436 | 2.31 | 1.48749 | 70.4 |
| 32 | −17.036 | 8.05 | | |
| 33 | ∞ | 0.55 | 1.51633 | 64.1 |
| 34 | ∞ | 2.02 | | |
| 35 | ∞ | 0.50 | 1.51633 | 64.1 |
| 36 | ∞ | — | | |

TABLE 2

ZOOM LENS SYSTEM DATA
Zoom Ratio 2.82

| | Short Focal Length Extremity | Intermediate Focal Length | Long Focal Length Extremity |
|---|---|---|---|
| FNO. | 2.9 | 2.9 | 2.9 |
| f | 15.45 | 26.00 | 43.64 |
| W | 17.5 | 10.2 | 6.0 |
| Y | 4.65 | 4.65 | 4.65 |
| fB | 0.53 | 0.53 | 0.53 |
| L | 75.00 | 75.00 | 75.00 |
| d6 | 5.43 | 5.43 | 5.43 |
| d10 | 1.20 | 11.63 | 17.64 |
| d15 | 11.44 | 7.73 | 1.60 |
| d20 | 7.72 | 1.00 | 1.12 |

TABLE 3

LENS GROUP DATA

| Lens Group | 1ˢᵗ Surf. | Focal Length |
|---|---|---|
| 1a(1) | 1 | 160.35 |
| 1b(1) | 7 | 57.70 |
| 2(2) | 11 | −11.60 |
| 3(3) | 16 | 29.95 |
| 4(4) | 22 | 26.42 |

Numerical Embodiment 2

Figure 7:
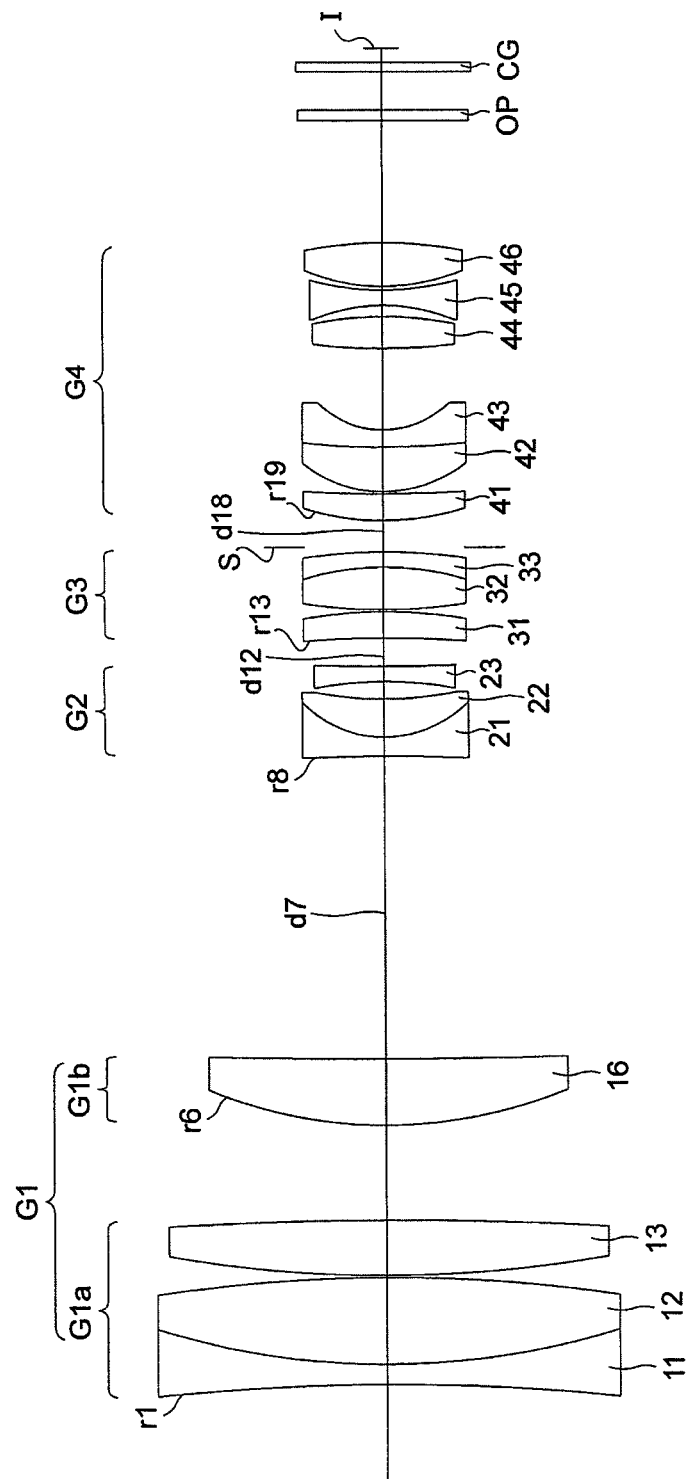
FIG. 7 shows a lens arrangement of a second numerical embodiment of a zoom lens system, according to the present invention, at the long focal length extremity when focused on an object at infinity.
Figure 10:
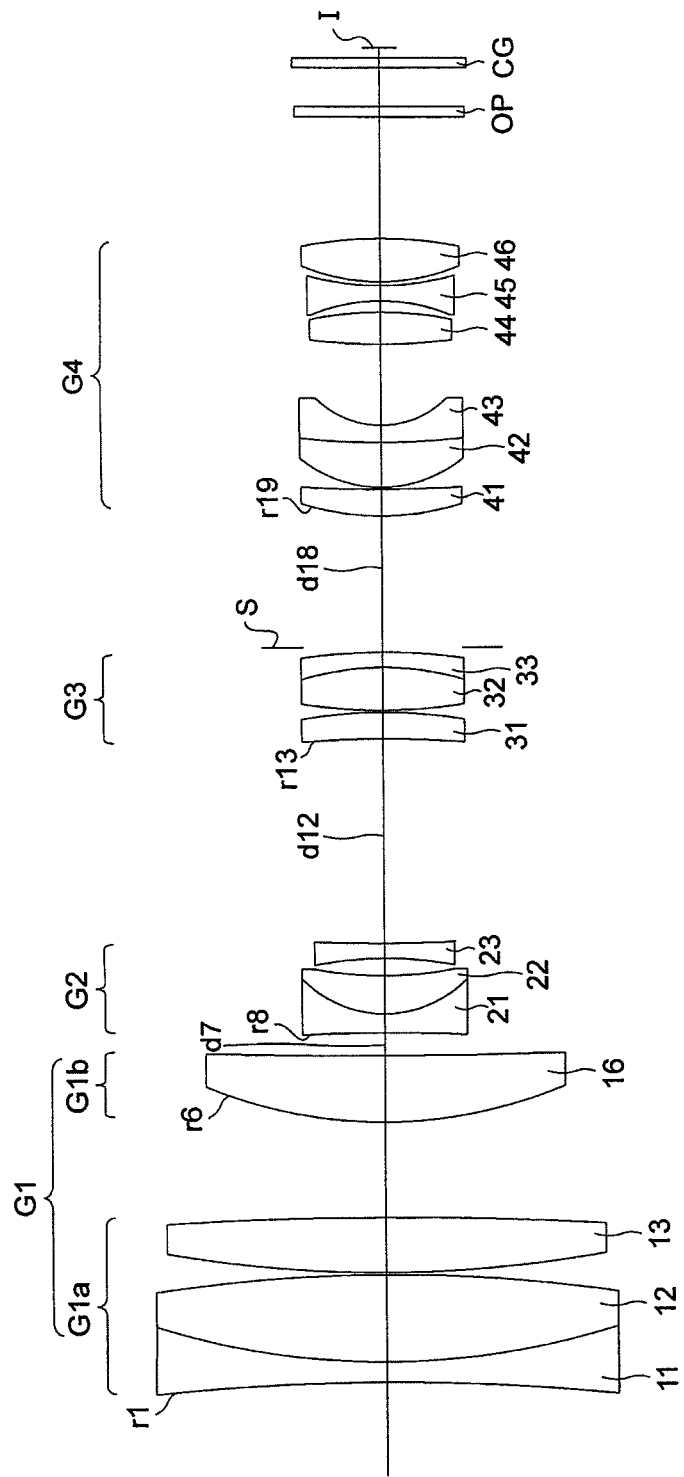
FIG. 10 shows a lens arrangement of the second numerical embodiment of the zoom lens system, according to the present invention, at the short focal length extremity when focused on an object at infinity.

FIGS. 7 through 12D and Tables 4 through 6 show a second numerical embodiment of the zoom lens system according to the present invention. FIG. 7 shows a lens arrangement of the second numerical embodiment of the zoom lens system when focusing on an object at infinity at the long focal length extremity. FIGS. 8A, 8B, 8C and 8D show various aberrations that occurred in the lens arrangement shown in FIG. 7. FIGS. 9A, 9B, 9C and 9D show lateral aberrations that occurred in the lens arrangement shown in FIG. 7. FIG. 10 shows a lens arrangement of the second numerical embodiment of the zoom lens system when focusing on an object at infinity at the short focal length extremity. FIGS. 11A, 11B, 11C and 11D show various aberrations that occurred in the lens arrangement shown in FIG. 10. FIGS. 12A, 12B, 12C and 12D show lateral aberrations that occurred in the lens arrangement shown in FIG. 10. Table 4 shows the lens surface data, Table 5 shows various zoom lens system data, and Table 6 shows the lens group data of the zoom lens system according to the second numerical embodiment.

The lens arrangement of the second numerical embodiment is the same as that of the first numerical embodiment except for the following:

(1) The biconcave negative lens element 11 and the biconvex positive lens element 12 of the first sub-lens group G1a are cemented to each other.

(2) The second sub-lens group G1b is configured of a single positive meniscus lens element 16 having a convex surface on the object side.

(3) The diaphragm S which is provided between the third lens group G3 and the fourth lens group G4 moves integrally with the third lens group G3 along the optical axis.

TABLE 4

SURFACE DATA

| Surf. No. | r | d | N(d) | vd |
|---|---|---|---|---|
| 1 | −119.189 | 1.10 | 1.63980 | 34.5 |
| 2 | 40.882 | 4.59 | 1.49700 | 81.6 |
| 3 | −82.262 | 0.10 | | |
| 4 | 67.349 | 2.90 | 1.48749 | 70.4 |
| 5 | −204.758 | d5 | | |
| 6 | 25.128 | 3.48 | 1.49700 | 81.6 |
| 7 | 380.221 | d7 | | |
| 8 | −99.860 | 1.00 | 1.83481 | 42.7 |
| 9 | 6.217 | 2.00 | 1.84666 | 23.8 |
| 10 | 20.055 | 0.91 | | |
| 11 | −19.872 | 0.80 | 1.72916 | 54.7 |
| 12 | 112.744 | d12 | | |
| 13 | −54.483 | 1.39 | 1.72916 | 54.7 |
| 14 | −25.286 | 0.10 | | |
| 15 | 27.720 | 2.26 | 1.48749 | 70.4 |
| 16 | −14.911 | 0.80 | 1.84666 | 23.8 |
| 17 | −29.157 | 0.24 | | |
| 18 (Diaphragm) | ∞ | d18 | | |
| 19 | 14.325 | 1.41 | 1.49700 | 81.6 |
| 20 | 77.357 | 0.10 | | |
| 21 | 6.966 | 2.36 | 1.61800 | 63.4 |
| 22 | 42.189 | 0.90 | 1.54814 | 45.8 |
| 23 | 4.992 | 4.27 | | |
| 24 | 31.994 | 1.67 | 1.74950 | 35.0 |
| 25 | −18.686 | 0.59 | | |
| 26 | −9.728 | 0.80 | 1.72342 | 38.0 |
| 27 | 14.850 | 0.20 | | |
| 28 | 10.986 | 2.27 | 1.48749 | 70.4 |
| 29 | −21.759 | 6.37 | | |
| 30 | ∞ | 0.55 | 1.51633 | 64.1 |
| 31 | ∞ | 2.02 | | |
| 32 | ∞ | 0.50 | 1.51633 | 64.1 |
| 33 | ∞ | — | | |

TABLE 5

ZOOM LENS SYSTEM DATA
Zoom Ratio 2.83

| | Short Focal Length Extremity | Intermediate Focal Length | Long Focal Length Extremity |
|---|---|---|---|
| FNO. | 2.9 | 2.9 | 2.9 |
| f | 15.45 | 26.00 | 43.66 |
| W | 17.5 | 10.2 | 6.0 |
| Y | 4.65 | 4.65 | 4.65 |
| fB | 0.53 | 0.53 | 0.54 |
| L | 70.00 | 70.00 | 70.00 |
| d5 | 4.99 | 4.99 | 4.99 |
| d7 | 1.19 | 10.63 | 15.90 |
| d12 | 10.72 | 7.23 | 1.49 |
| d18 | 6.89 | 0.94 | 1.40 |

TABLE 6

LENS GROUP DATA

| Lens Group | 1st Surf. | Focal Length |
|---|---|---|
| 1a(1) | 1 | 137.93 |
| 1b(1) | 6 | 53.96 |
| 2(2) | 8 | −10.53 |
| 3(3) | 13 | 26.23 |
| 4(4) | 19 | 26.14 |

Numerical Embodiment 3

Figure 13:
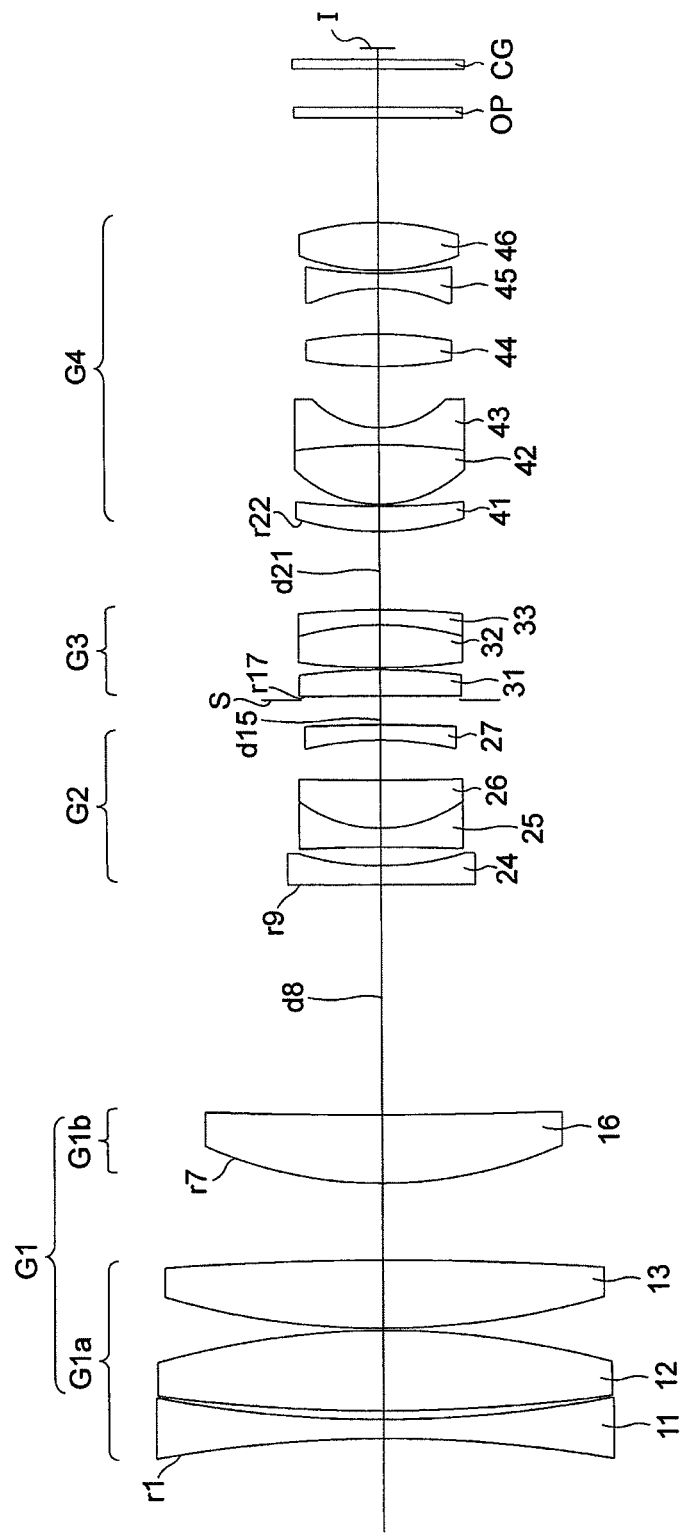
FIG. 13 shows a lens arrangement of a third numerical embodiment of a zoom lens system, according to the present invention, at the long focal length extremity when focused on an object at infinity.
Figure 16:
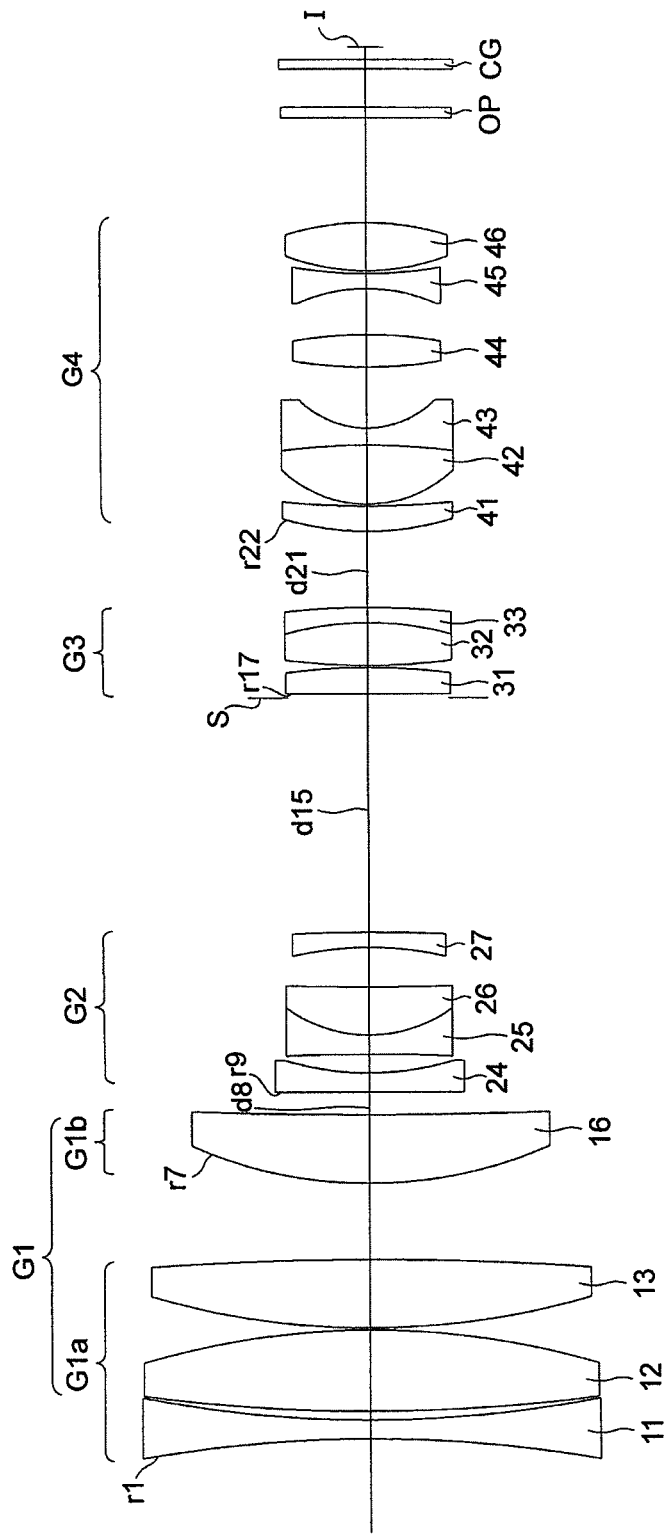
FIG. 16 shows a lens arrangement of the third numerical embodiment of the zoom lens system, according to the present invention, at the short focal length extremity when focused on an object at infinity.

FIGS. 13 through 18D and Tables 7 through 9 show a third numerical embodiment of the zoom lens system according to the present invention. FIG. 13 shows a lens arrangement of the third numerical embodiment of the zoom lens system when focusing on an object at infinity at the long focal length extremity. FIGS. 14A, 14B, 14C and 14D show various aberrations that occurred in the lens arrangement shown in FIG. 13. FIGS. 15A, 15B, 15C and 15D show lateral aberrations that occurred in the lens arrangement shown in FIG. 13. FIG. 16 shows a lens arrangement of the third numerical embodiment of the zoom lens system when focusing on an object at infinity at the short focal length extremity. FIGS. 17A, 17B, 17C and 17D show various aberrations that occurred in the lens arrangement shown in FIG. 16. FIGS. 18A, 18B, 18C and 18D show lateral aberrations that occurred in the lens arrangement shown in FIG. 16. Table 7 shows the lens surface data, Table 8 shows various zoom lens system data, and Table 9 shows the lens group data of the zoom lens system according to the third numerical embodiment.

The lens arrangement of the third numerical embodiment is the same as that of the first numerical embodiment except for the following aspects:

(1) The second sub-lens group G1b is configured of a single positive meniscus lens element 16 having a convex surface on the object side.

(2) The second lens group G2 is configured of a negative meniscus lens element 24 having a convex surface on the object side; and a cemented lens formed from a biconcave negative lens element 25 and a positive meniscus lens element 26 having a convex surface on the object side; and a negative meniscus lens element 27 having a convex surface on the image side, in that order from the object side.

(3) The diaphragm S which is provided between the second lens group G2 and the third lens group G3 moves integrally with the third lens group G3 along the optical axis.

(4) The positive lens element 42 of the fourth lens group G4 is a biconvex positive lens element, and the negative lens element 43 of the fourth lens group G4 is a biconcave negative lens element.

TABLE 7

SURFACE DATA

| Surf. No. | r | d | N(d) | vd |
|---|---|---|---|---|
| 1 | −70.023 | 1.00 | 1.67270 | 32.2 |
| 2 | 63.228 | 0.47 | | |
| 3 | 92.238 | 4.34 | 1.43875 | 95.0 |
| 4 | −42.845 | 0.10 | | |
| 5 | 41.812 | 3.60 | 1.48749 | 70.4 |
| 6 | −170.942 | d6 | | |
| 7 | 23.765 | 3.61 | 1.49700 | 81.6 |
| 8 | 277.785 | d8 | | |
| 9 | 760.281 | 1.00 | 1.62041 | 60.3 |

TABLE 7-continued

SURFACE DATA

| Surf. No. | r | d | N(d) | νd |
|---|---|---|---|---|
| 10 | 15.575 | 0.98 | | |
| 11 | −104.588 | 1.00 | 1.75500 | 52.3 |
| 12 | 7.520 | 2.53 | 1.74077 | 27.8 |
| 13 | 126.244 | 2.10 | | |
| 14 | −18.122 | 0.80 | 1.80420 | 46.5 |
| 15 | −92.634 | d15 | | |
| 16 (Diaphragm) | ∞ | 0.20 | | |
| 17 | −52374.977 | 1.39 | 1.72916 | 54.7 |
| 18 | −33.169 | 0.10 | | |
| 19 | 33.599 | 2.26 | 1.48749 | 70.4 |
| 20 | −16.665 | 0.80 | 1.84666 | 23.8 |
| 21 | −44.087 | d21 | | |
| 22 | 15.200 | 1.33 | 1.60300 | 65.5 |
| 23 | 44.924 | 0.10 | | |
| 24 | 6.613 | 3.12 | 1.49700 | 81.6 |
| 25 | −36.498 | 0.90 | 1.56384 | 60.8 |
| 26 | 5.121 | 3.19 | | |
| 27 | 23.799 | 1.70 | 1.75211 | 25.0 |
| 28 | −22.589 | 2.39 | | |
| 29 | −9.256 | 0.80 | 1.80518 | 25.5 |
| 30 | 22.697 | 0.15 | | |
| 31 | 12.247 | 2.51 | 1.48749 | 70.4 |
| 32 | −14.816 | 5.48 | | |
| 33 | ∞ | 0.55 | 1.51633 | 64.1 |
| 34 | ∞ | 2.02 | | |
| 35 | ∞ | 0.50 | 1.51633 | 64.1 |
| 36 | ∞ | — | | |

TABLE 8

ZOOM LENS SYSTEM DATA
Zoom Ratio 2.83

| | Short Focal Length Extremity | Intermediate Focal Length | Long Focal Length Extremity |
|---|---|---|---|
| FNO. | 2.9 | 2.9 | 2.9 |
| f | 15.45 | 26.01 | 43.65 |
| W | 17.4 | 10.1 | 6.0 |
| Y | 4.65 | 4.65 | 4.65 |
| fB | 0.53 | 0.53 | 0.53 |
| L | 73.00 | 73.00 | 73.00 |
| d6 | 4.00 | 4.00 | 4.00 |
| d8 | 1.18 | 8.11 | 12.04 |
| d15 | 12.29 | 8.10 | 1.30 |
| d21 | 3.98 | 1.24 | 4.11 |

TABLE 9

LENS GROUP DATA

| Lens Group | 1st Surf. | Focal Length |
|---|---|---|
| 1a(1) | 1 | 92.93 |
| 1b(1) | 7 | 52.05 |
| 2(2) | 9 | −10.06 |
| 3(3) | 17 | 29.33 |
| 4(4) | 22 | 27.53 |

Numerical Embodiment 4

Figure 19:
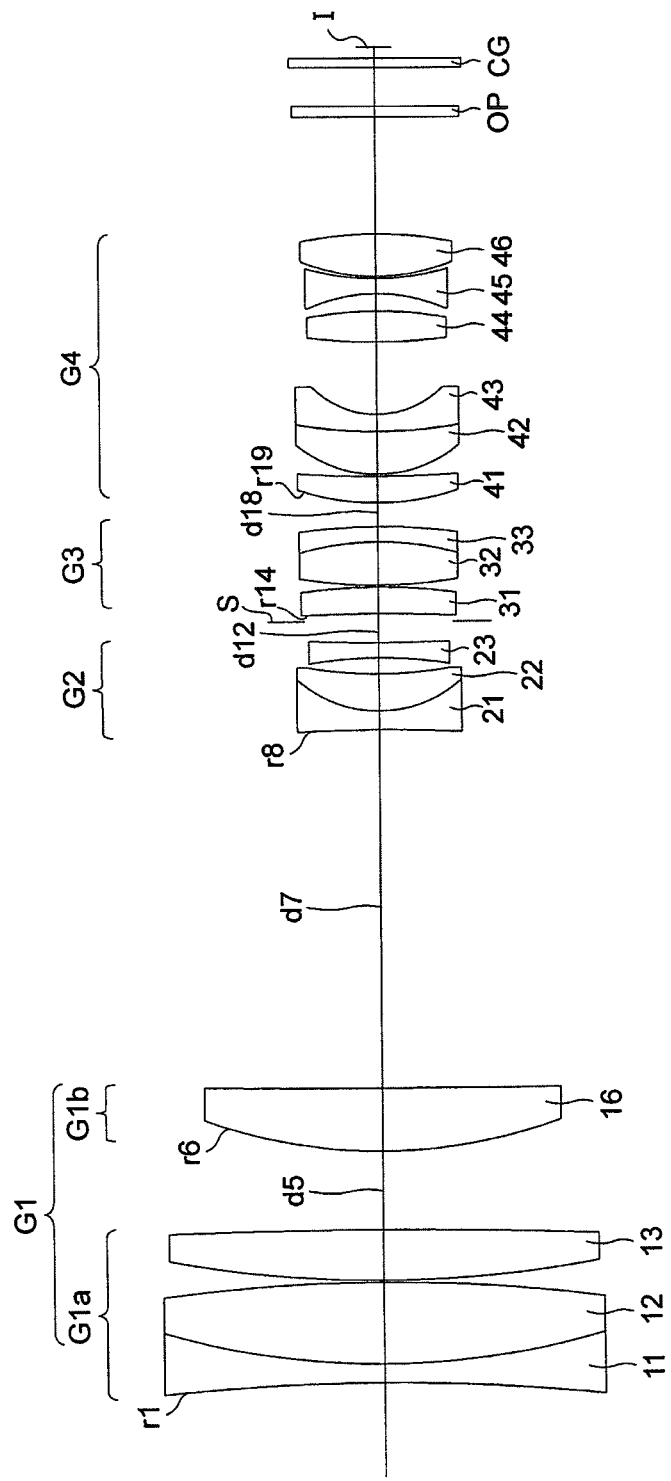
FIG. 19 shows a lens arrangement of a fourth numerical embodiment of a zoom lens system, according to the present invention, at the long focal length extremity when focused on an object at infinity.
Figure 22:
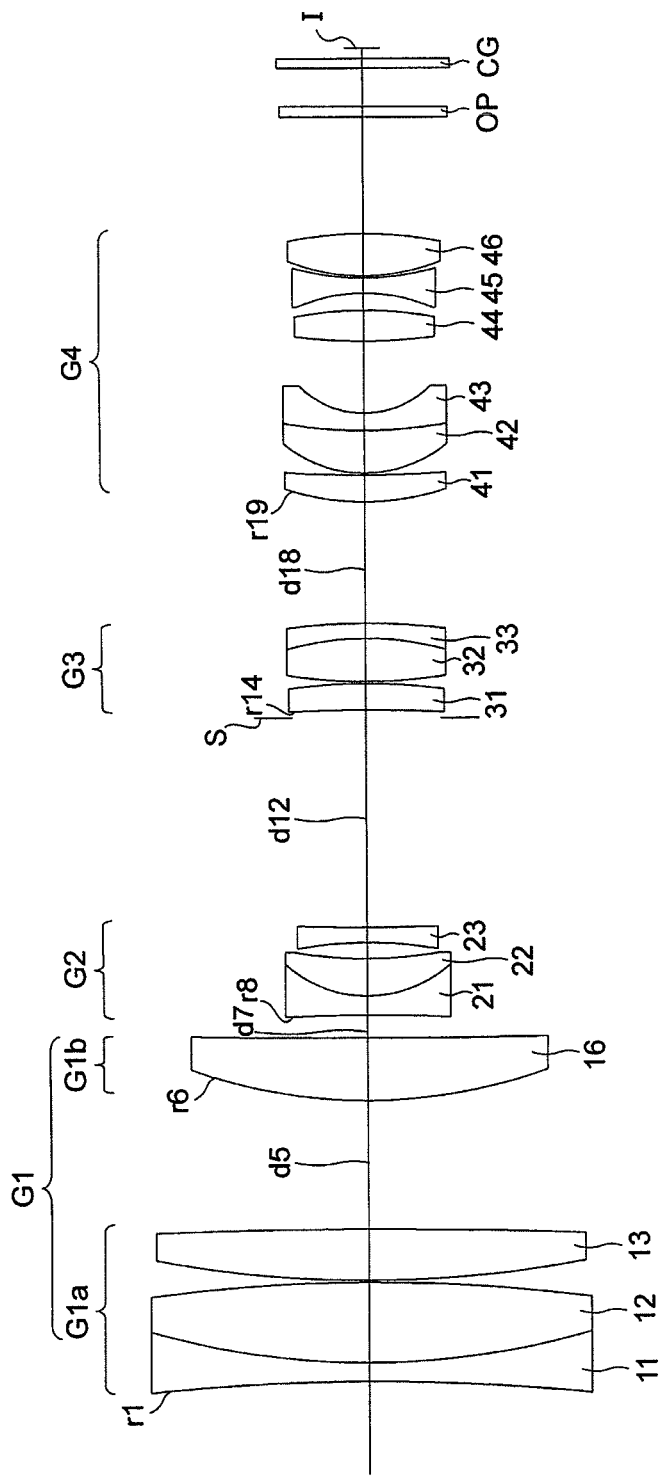
FIG. 22 shows a lens arrangement of the fourth numerical embodiment of the zoom lens system, according to the present invention, at the short focal length extremity when focused on an object at infinity.

FIGS. 19 through 24D and Tables 10 through 12 show a fourth numerical embodiment of the zoom lens system according to the present invention. FIG. 19 shows a lens arrangement of the fourth numerical embodiment of the zoom lens system when focusing on an object at infinity at the long focal length extremity. FIGS. 20A, 20B, 20C and 20D show various aberrations that occurred in the lens arrangement shown in FIG. 19. FIGS. 21A, 21B, 21C and 21D show lateral aberrations that occurred in the lens arrangement shown in FIG. 19. FIG. 22 shows a lens arrangement of the fourth numerical embodiment of the zoom lens system when focusing on an object at infinity at the short focal length extremity. FIGS. 23A, 23B, 23C and 23D show various aberrations that occurred in the lens arrangement shown in FIG. 22. FIGS. 24A, 24B, 24C and 24D show lateral aberrations that occurred in the lens arrangement shown in FIG. 22. Table 10 shows the lens surface data, Table 11 shows various zoom lens system data, and Table 12 shows the lens group data of the zoom lens system according to the fourth numerical embodiment.

The lens arrangement of the fourth numerical embodiment is the same as that of the second numerical embodiment except for the following aspect:

(1) The diaphragm S which is provided between the second lens group G2 and the third lens group G3 moves integrally with the third lens group G3 along the optical axis.

TABLE 10

SURFACE DATA

| Surf. No. | r | d | N(d) | νd |
|---|---|---|---|---|
| 1 | −113.316 | 1.00 | 1.63636 | 35.4 |
| 2 | 41.549 | 4.30 | 1.49700 | 81.6 |
| 3 | −91.198 | 0.10 | | |
| 4 | 63.331 | 2.67 | 1.48749 | 70.4 |
| 5 | −331.372 | d5 | | |
| 6 | 28.235 | 3.29 | 1.49700 | 81.6 |
| 7 | 616.586 | d7 | | |
| 8 | −88.983 | 1.00 | 1.83481 | 42.7 |
| 9 | 6.697 | 1.95 | 1.84666 | 23.8 |
| 10 | 22.839 | 0.84 | | |
| 11 | −22.543 | 0.80 | 1.72916 | 54.7 |
| 12 | 125.794 | d12 | | |
| 13 (Diaphragm) | ∞ | 0.40 | | |
| 14 | −96.774 | 1.39 | 1.72916 | 54.7 |
| 15 | −31.637 | 0.10 | | |
| 16 | 25.863 | 2.28 | 1.48749 | 70.4 |
| 17 | −15.659 | 0.80 | 1.84666 | 23.8 |
| 18 | −33.388 | d18 | | |
| 19 | 13.719 | 1.40 | 1.49700 | 81.6 |
| 20 | 61.541 | 0.10 | | |
| 21 | 6.851 | 2.25 | 1.61800 | 63.4 |
| 22 | 25.616 | 0.90 | 1.54814 | 45.8 |
| 23 | 4.995 | 3.80 | | |
| 24 | 28.111 | 1.63 | 1.74950 | 35.0 |
| 25 | −20.207 | 0.91 | | |
| 26 | −9.140 | 0.80 | 1.72342 | 38.0 |
| 27 | 14.468 | 0.10 | | |
| 28 | 10.992 | 2.21 | 1.48749 | 70.4 |
| 29 | −20.872 | 6.09 | | |
| 30 | ∞ | 0.55 | 1.51633 | 64.1 |
| 31 | ∞ | 2.02 | | |
| 32 | ∞ | 0.50 | 1.51633 | 64.1 |
| 33 | ∞ | — | | |

TABLE 11

ZOOM LENS SYSTEM DATA
Zoom Ratio 2.83

| | Short Focal Length Extremity | Intermediate Focal Length | Long Focal Length Extremity |
|---|---|---|---|
| FNO. | 2.9 | 2.9 | 2.9 |
| f | 15.45 | 26.00 | 43.65 |
| W | 17.5 | 10.2 | 6.0 |
| Y | 4.65 | 4.65 | 4.65 |
| fB | 0.53 | 0.53 | 0.53 |
| L | 69.99 | 69.98 | 69.98 |

TABLE 11-continued

ZOOM LENS SYSTEM DATA
Zoom Ratio 2.83

|  | Short Focal Length Extremity | Intermediate Focal Length | Long Focal Length Extremity |
|---|---|---|---|
| d5 | 6.74 | 4.12 | 4.10 |
| d7 | 1.20 | 12.68 | 18.81 |
| d12 | 11.00 | 7.23 | 1.10 |
| d18 | 6.34 | 1.24 | 1.26 |

TABLE 12

LENS GROUP DATA

| Lens Group | 1$^{st}$ Surf. | Focal Length |
|---|---|---|
| 1a(1) | 1 | 165.15 |
| 1b(2) | 6 | 59.43 |
| 2(3) | 8 | −11.70 |
| 3(4) | 14 | 27.21 |
| 4(5) | 19 | 26.70 |

Numerical Embodiment 5

Figure 25:
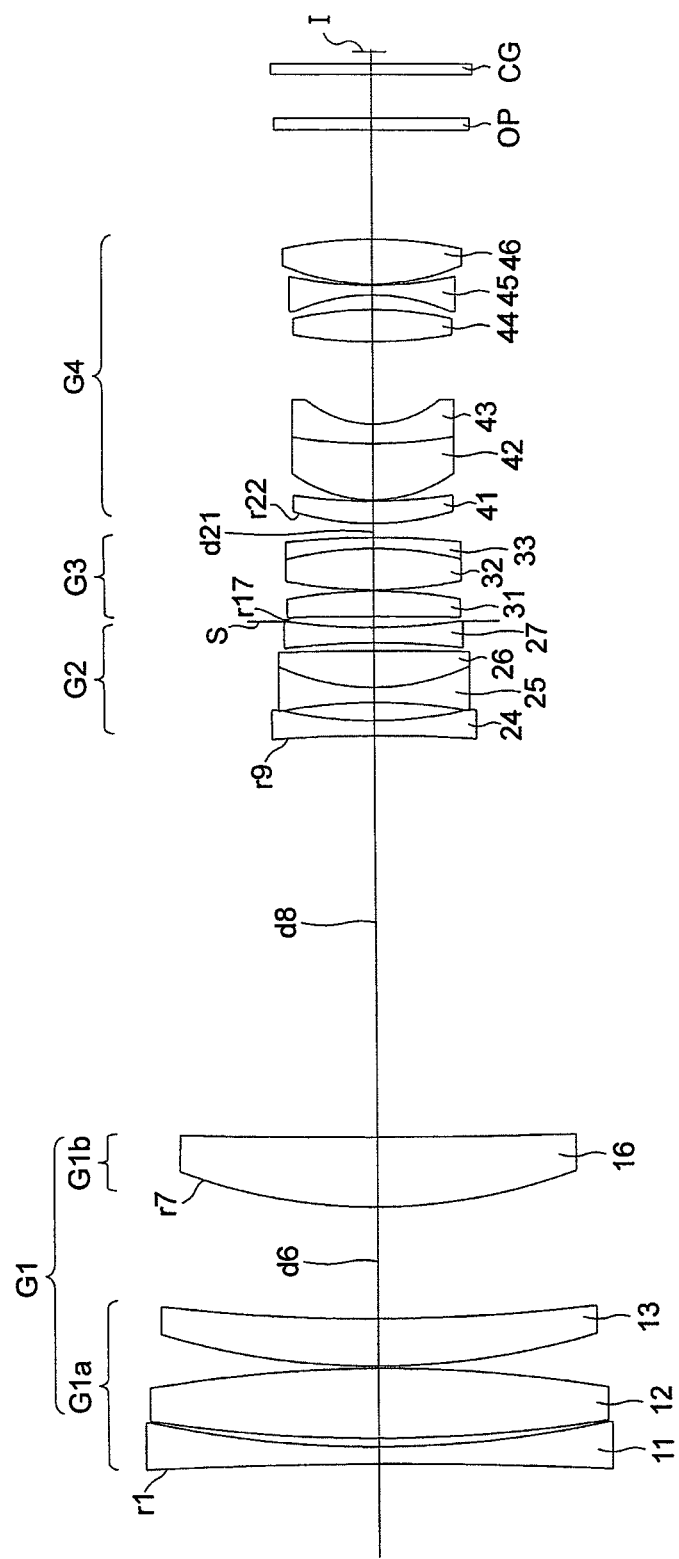
FIG. 25 shows a lens arrangement of a fifth numerical embodiment of a zoom lens system, according to the present invention, at the long focal length extremity when focused on an object at infinity.
Figures 26A, 26B, 26C, 26D:
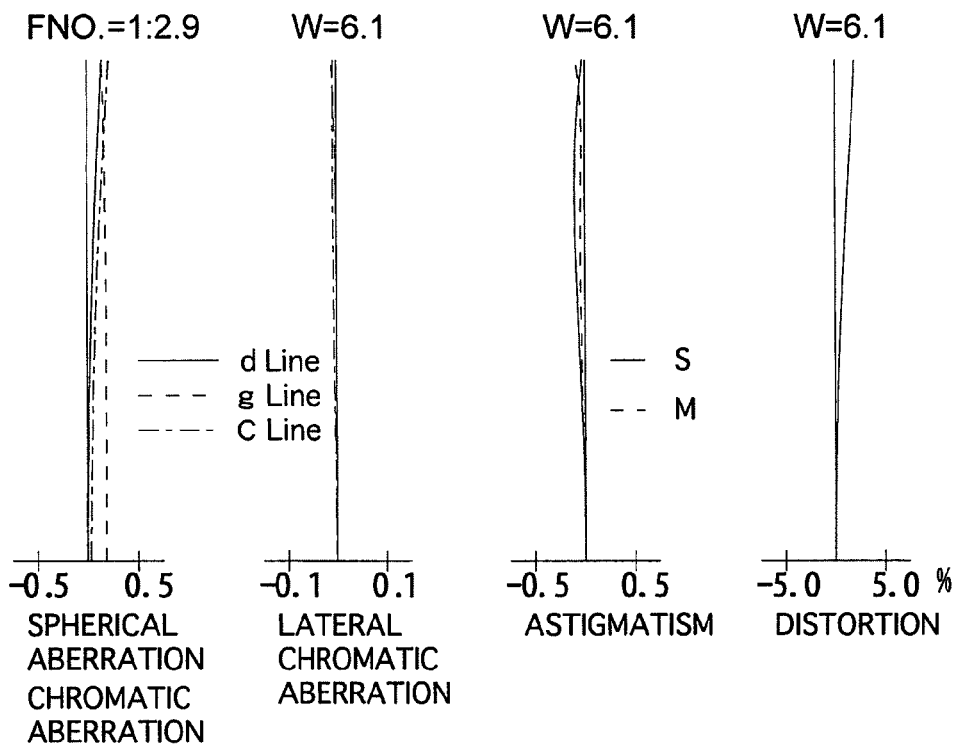
FIGS. 26A, 26B, 26C and 26D show various aberrations that occurred in the lens arrangement of FIG. 25.
Figure 27A:
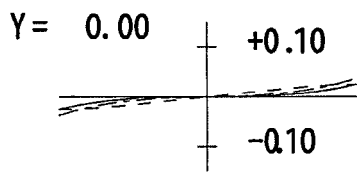
FIGS. 27A, 27B, 27C and 27D show lateral aberrations that occurred in the lens arrangement of FIG. 25.
Figure 27B:
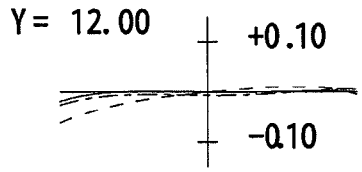
Figure 27C:
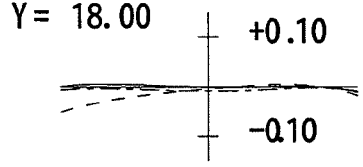
Figure 27D:
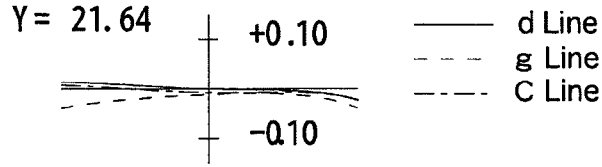
Figure 28:
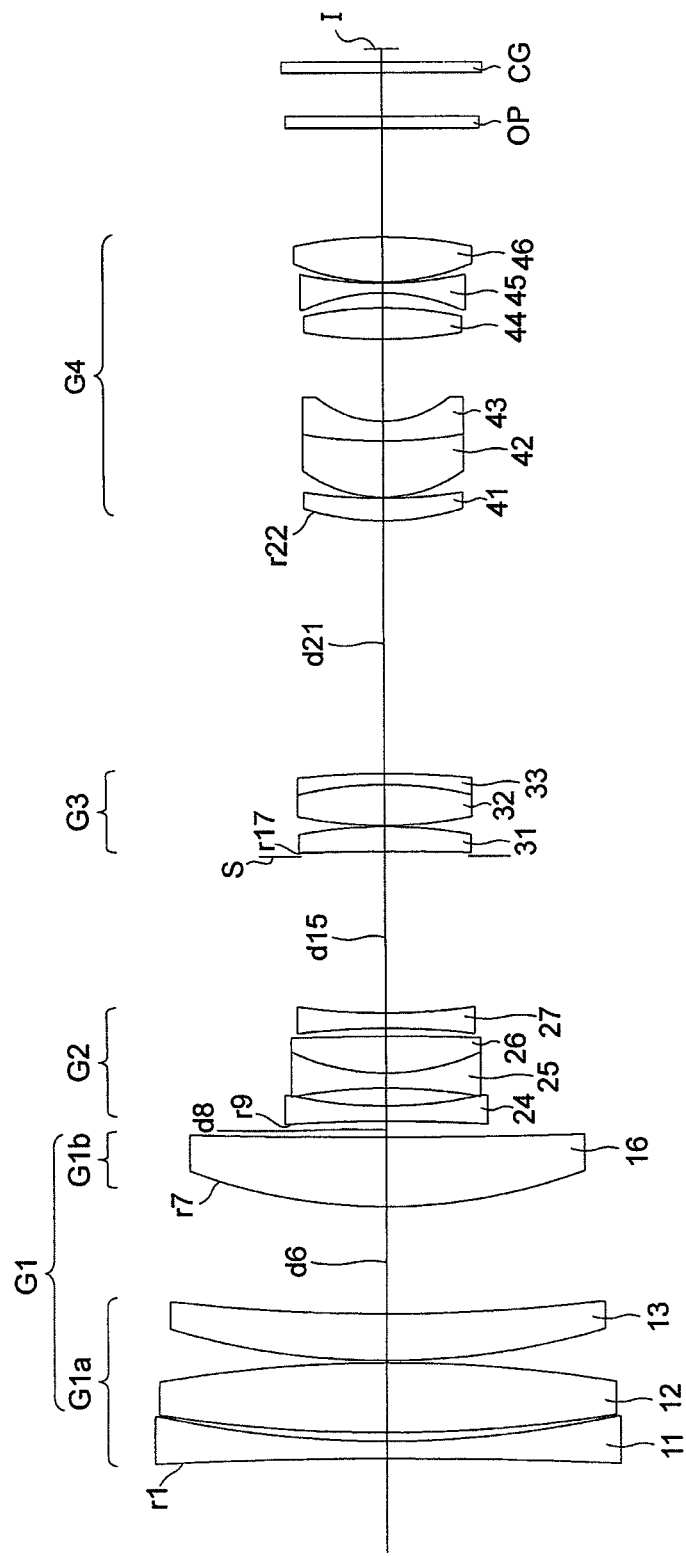
FIG. 28 shows a lens arrangement of the fifth numerical embodiment of the zoom lens system, according to the present invention, at the short focal length extremity when focused on an object at infinity.
Figures 29A, 29B, 29C, 29D:
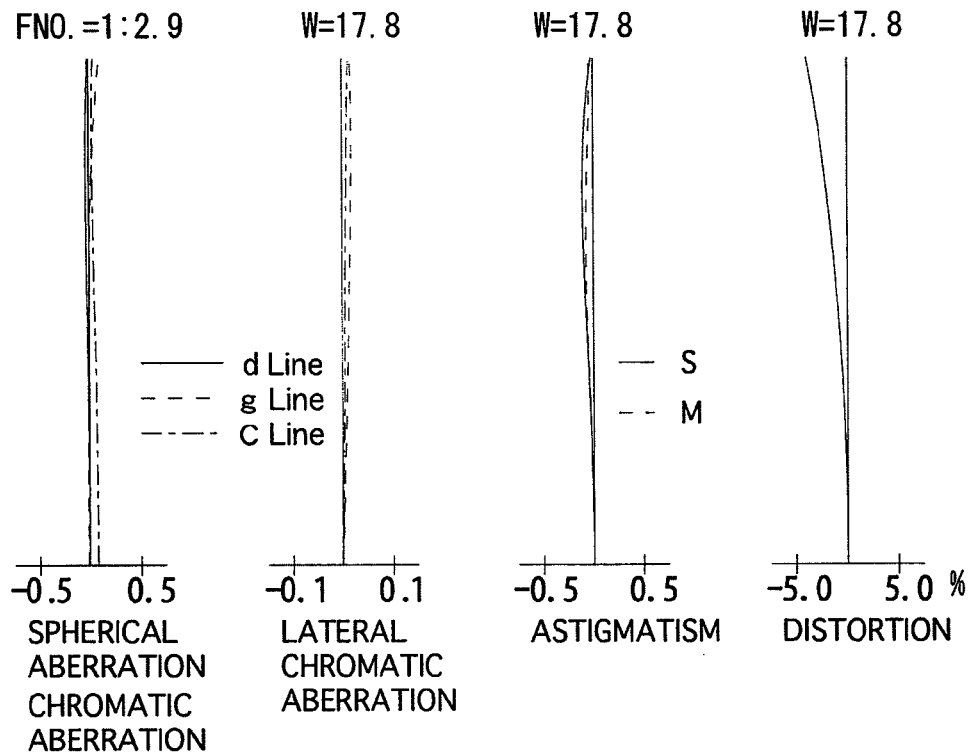
FIGS. 29A, 29B, 29C and 29D show various aberrations that occurred in the lens arrangement of FIG. 28.
Figure 30A:
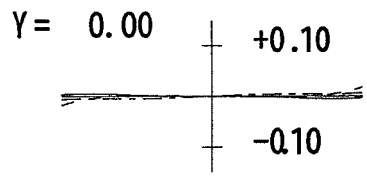
FIGS. 30A, 30B, 30C and 30D show lateral aberrations that occurred in the lens arrangement of FIG. 28.
Figure 30B:
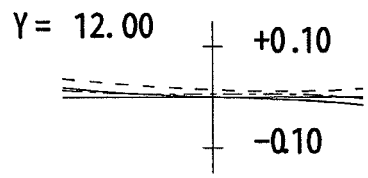
Figure 30C:
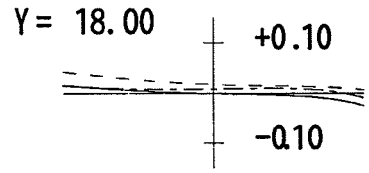
Figure 30D:
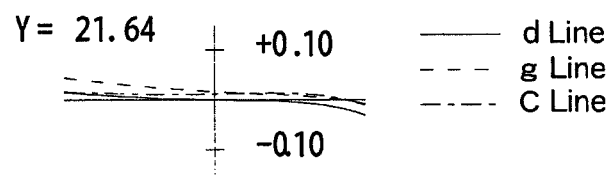

FIGS. 25 through 30D and Tables 13 through 15 show a fifth numerical embodiment of the zoom lens system according to the present invention. FIG. 25 shows a lens arrangement of the fifth numerical embodiment of the zoom lens system when focusing on an object at infinity at the long focal length extremity. FIGS. 26A, 26B, 26C and 26D show various aberrations that occurred in the lens arrangement shown in FIG. 25. FIGS. 27A, 27B, 27C and 27D show lateral aberrations that occurred in the lens arrangement shown in FIG. 25. FIG. 28 shows a lens arrangement of the fifth numerical embodiment of the zoom lens system when focusing on an object at infinity at the short focal length extremity. FIGS. 29A, 29B, 29C and 29D show various aberrations that occurred in the lens arrangement shown in FIG. 28. FIGS. 30A, 30B, 30C and 30D show lateral aberrations that occurred in the lens arrangement shown in FIG. 28. Table 13 shows the lens surface data, Table 14 shows various zoom lens system data, and Table 15 shows the lens group data of the zoom lens system according to the fifth numerical embodiment.

The lens arrangement of the fifth numerical embodiment is the same as that of the third numerical embodiment except for the following aspect:

(1) The positive lens element 13 of the first sub-lens group G1a is a positive meniscus lens element having a convex surface on the object side.

(2) In regard to the second lens group G2, the negative lens element 24 is a biconcave lens element, the positive lens element 26 is a biconvex positive lens element, and the negative lens element 27 is a biconcave negative lens element.

(3) In regard to the fourth lens group G4, the positive lens element 42 is a positive meniscus lens element having a convex surface on the object side, and the negative lens element 43 is a negative meniscus lens element having a convex surface on the object side.

TABLE 13

SURFACE DATA

| Surf. No. | r | d | N(d) | vd |
|---|---|---|---|---|
| 1 | −1078.793 | 3.64 | 1.67270 | 32.2 |
| 2 | 228.294 | 1.82 | | |
| 3 | 318.254 | 15.02 | 1.49700 | 81.6 |
| 4 | −283.104 | 0.45 | | |
| 5 | 160.240 | 9.97 | 1.48749 | 70.4 |
| 6 | 402.704 | d6 | | |
| 7 | 121.556 | 14.61 | 1.49700 | 81.6 |
| 8 | 1644.390 | d8 | | |
| 9 | −332.485 | 3.18 | 1.80420 | 46.5 |
| 10 | 92.022 | 3.79 | | |
| 11 | −115.625 | 3.18 | 1.61800 | 63.4 |
| 12 | 49.051 | 7.68 | 1.84666 | 23.8 |
| 13 | −769.319 | 1.70 | | |
| 14 | −162.801 | 3.18 | 1.83400 | 37.3 |
| 15 | 134.984 | d15 | | |
| 16 (Diaphragm) | ∞ | 1.00 | | |
| 17 | −900.404 | 5.32 | 1.72916 | 54.7 |
| 18 | −101.728 | 0.23 | | |
| 19 | 93.925 | 8.62 | 1.49700 | 81.6 |
| 20 | −80.655 | 2.28 | 1.84666 | 23.8 |
| 21 | −185.427 | d21 | | |
| 22 | 58.914 | 4.70 | 1.72916 | 54.7 |
| 23 | 117.106 | 0.23 | | |
| 24 | 29.271 | 11.83 | 1.49700 | 81.6 |
| 25 | 105.898 | 4.09 | 1.58267 | 46.6 |
| 26 | 22.521 | 17.32 | | |
| 27 | 102.961 | 6.63 | 1.69680 | 55.5 |
| 28 | −77.290 | 3.10 | | |
| 29 | −41.651 | 2.05 | 1.74400 | 44.9 |
| 30 | 87.545 | 0.23 | | |
| 31 | 49.088 | 9.35 | 1.48749 | 70.4 |
| 32 | −93.640 | 22.75 | | |
| 33 | ∞ | 2.50 | 1.51633 | 64.1 |
| 34 | ∞ | 9.19 | | |
| 35 | ∞ | 2.27 | 1.51633 | 64.1 |
| 36 | ∞ | — | | |

TABLE 14

ZOOM LENS SYSTEM DATA
Zoom Ratio 2.82

|  | Short Focal Length Extremity | Intermediate Focal Length | Long Focal Length Extremity |
|---|---|---|---|
| FNO. | 2.9 | 3.0 | 2.9 |
| f | 70.21 | 118.15 | 198.32 |
| W | 17.8 | 10.4 | 6.1 |
| Y | 21.64 | 21.64 | 21.64 |
| fB | 2.49 | 2.49 | 2.48 |
| L | 296.16 | 296.16 | 296.16 |
| d6 | 22.46 | 17.20 | 23.42 |
| d8 | 3.43 | 58.65 | 84.10 |
| d15 | 32.85 | 21.40 | 1.28 |
| d21 | 53.02 | 14.51 | 2.96 |

TABLE 15

LENS GROUP DATA

| Lens Group | 1$^{st}$ Surf. | Focal Length |
|---|---|---|
| 1a(1) | 1 | 584.42 |
| 1b(2) | 7 | 263.26 |
| 2(3) | 9 | −42.29 |
| 3(4) | 17 | 84.42 |
| 4(5) | 22 | 125.89 |

Numerical Embodiment 6

Figure 31:
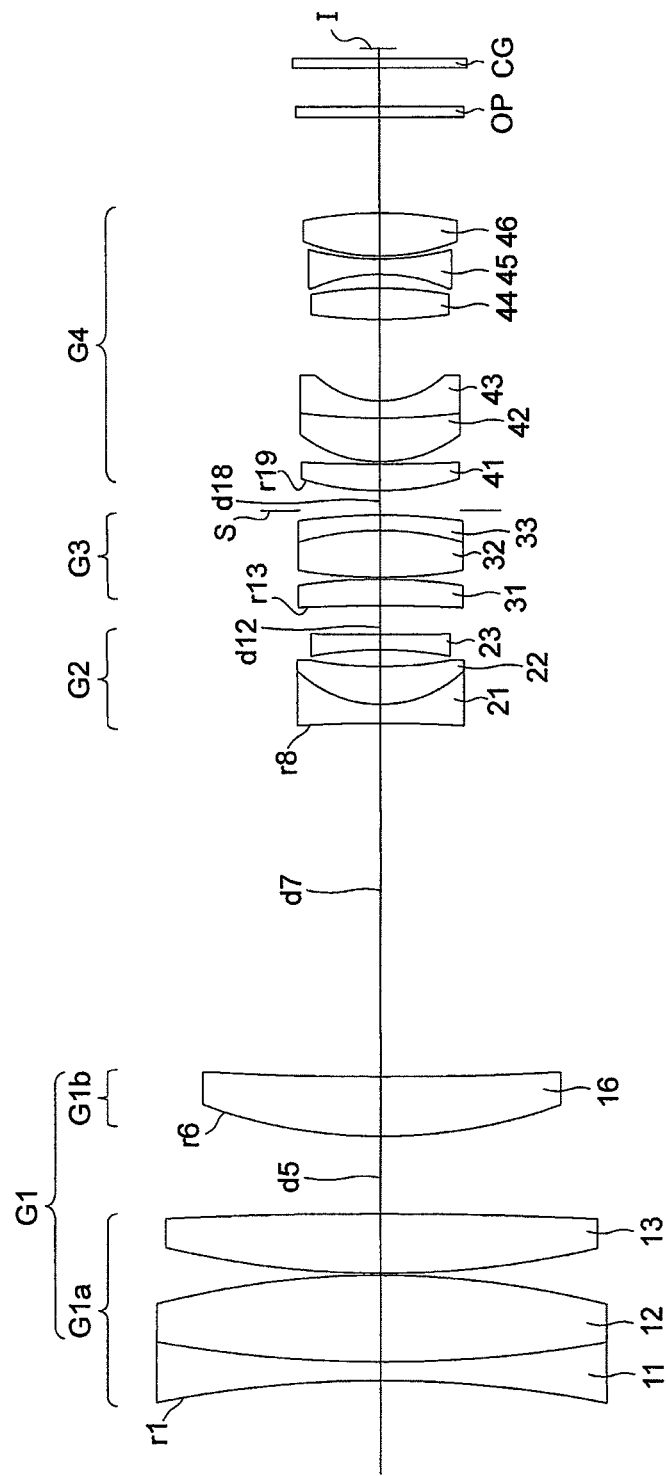
FIG. 31 shows a lens arrangement of a sixth numerical embodiment of a zoom lens system, according to the present invention, at the long focal length extremity when focused on an object at infinity.
Figure 34:
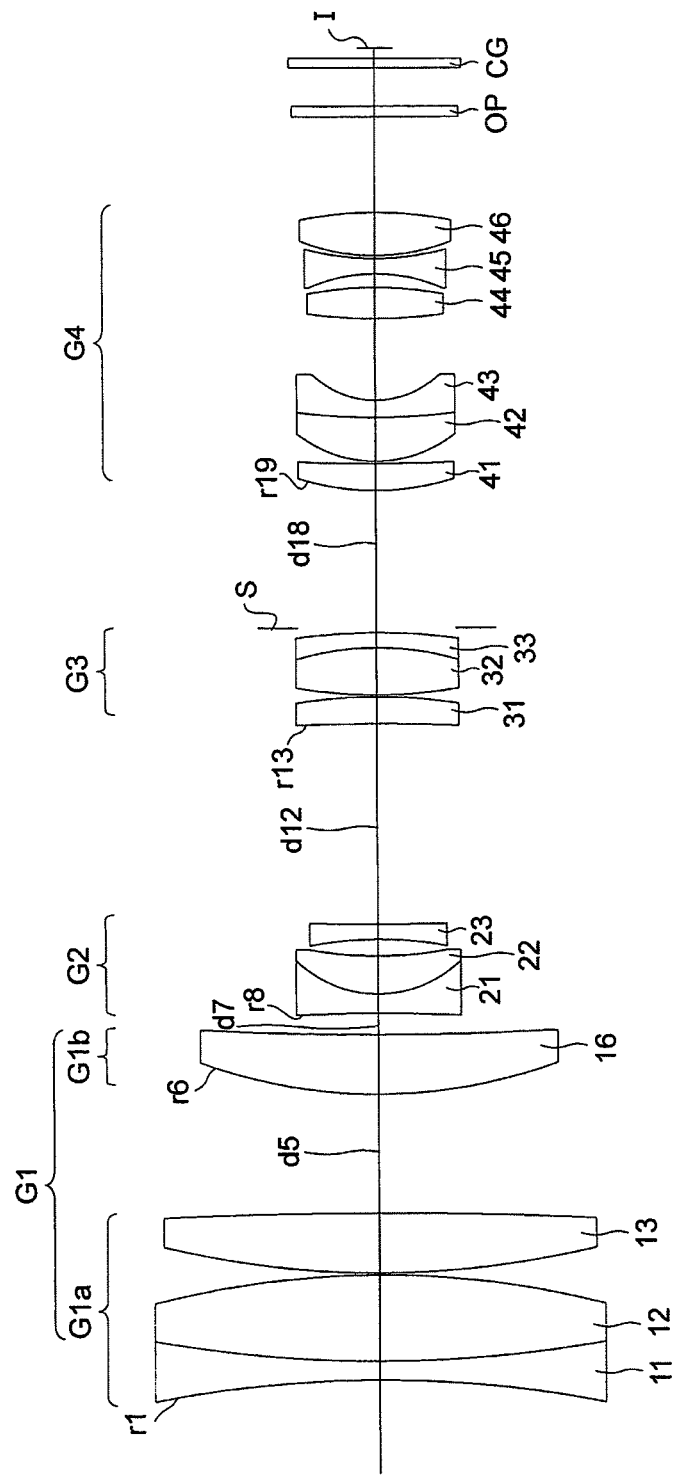
FIG. 34 shows a lens arrangement of the sixth numerical embodiment of the zoom lens system, according to the present invention, at the short focal length extremity when focused on an object at infinity.

FIGS. 31 through 36D and Tables 16 through 18 show a sixth numerical embodiment of the zoom lens system according to the present invention. FIG. 31 shows a lens arrangement of the sixth numerical embodiment of the zoom lens system when focusing on an object at infinity at the long focal length extremity. FIGS. 32A, 32B, 32C and 32D show various aberrations that occurred in the lens arrangement shown in FIG. 31. FIGS. 33A, 33B, 33C and 33D show lateral aberrations that occurred in the lens arrangement shown in FIG. 31. FIG. 34 shows a lens arrangement of the sixth numerical embodiment of the zoom lens system when focusing on an object at infinity at the short focal length extremity. FIGS. 35A, 35B, 35C and 35D show various aberrations that occurred in the lens arrangement shown in FIG. 34. FIGS. 36A, 36B, 36C and 36D show lateral aberrations that occurred in the lens arrangement shown in FIG. 34. Table 16 shows the lens surface data, Table 17 shows various zoom lens system data, and Table 18 shows the lens group data of the zoom lens system according to the sixth numerical embodiment.

The lens arrangement of the sixth numerical embodiment is the same as that of the second numerical embodiment.

TABLE 16

SURFACE DATA

| Surf. No. | r | d | N(d) | vd |
|---|---|---|---|---|
| 1 | −61.575 | 1.00 | 1.63980 | 34.6 |
| 2 | 68.594 | 4.59 | 1.43875 | 95.0 |
| 3 | −48.112 | 0.10 | | |
| 4 | 49.828 | 3.12 | 1.48749 | 70.4 |
| 5 | −254.458 | d5 | | |
| 6 | 28.028 | 3.12 | 1.49700 | 81.6 |
| 7 | 184.038 | d7 | | |
| 8 | −88.250 | 1.00 | 1.83481 | 42.7 |
| 9 | 6.390 | 2.00 | 1.84666 | 23.8 |
| 10 | 20.873 | 0.88 | | |
| 11 | −19.969 | 0.80 | 1.72916 | 54.7 |
| 12 | 188.406 | d12 | | |
| 13 | −111.911 | 1.40 | 1.72916 | 54.7 |
| 14 | −29.189 | 0.10 | | |
| 15 | 26.449 | 2.47 | 1.48749 | 70.4 |
| 16 | −15.427 | 0.80 | 1.84666 | 23.8 |
| 17 | −31.044 | 0.24 | | |
| 18 (Diaphragm) | ∞ | d18 | | |
| 19 | 14.211 | 1.41 | 1.49700 | 81.6 |
| 20 | 96.066 | 0.12 | | |
| 21 | 6.943 | 2.31 | 1.61800 | 63.4 |
| 22 | 35.507 | 0.90 | 1.54814 | 45.8 |
| 23 | 5.015 | 4.27 | | |
| 24 | 26.408 | 1.64 | 1.66446 | 35.8 |
| 25 | −19.641 | 0.72 | | |
| 26 | −9.068 | 0.80 | 1.72342 | 38.0 |
| 27 | 14.824 | 0.15 | | |
| 28 | 11.075 | 2.26 | 1.48749 | 70.4 |
| 29 | −20.783 | 5.03 | | |
| 30 | ∞ | 0.55 | 1.51633 | 64.1 |
| 31 | ∞ | 2.02 | | |
| 32 | ∞ | 0.50 | 1.51633 | 64.1 |
| 33 | ∞ | — | | |

TABLE 17

ZOOM LENS SYSTEM DATA
Zoom Ratio 2.83

| | Short Focal Length Extremity | Intermediate Focal Length | Long Focal Length Extremity |
|---|---|---|---|
| FNO. | 2.9 | 2.9 | 2.9 |
| f | 15.41 | 26.00 | 43.65 |
| W | 17.6 | 10.2 | 6.0 |
| Y | 4.65 | 4.65 | 4.65 |
| fB | 0.54 | 0.53 | 0.53 |
| L | 69.93 | 70.00 | 70.00 |
| d5 | 6.22 | 4.42 | 4.06 |
| d7 | 1.12 | 12.64 | 18.57 |
| d12 | 10.53 | 7.11 | 1.50 |
| d18 | 7.23 | 1.00 | 1.05 |

TABLE 18

LENS GROUP DATA

| Lens Group | 1$^{st}$ Surf. | Focal Length |
|---|---|---|
| 1a(1) | 1 | 118.00 |
| 1b(2) | 6 | 66.09 |
| 2(3) | 8 | −10.93 |
| 3(4) | 13 | 24.59 |
| 4(5) | 19 | 27.79 |

The numerical values of each condition for each embodiment are shown in Table 19. In the first, second, fourth and fifth numerical embodiments, the first lens group G1 does not have a positive lens element that satisfies condition (5).

TABLE 19

| | Embod. 1 | Embod. 2 | Embod. 3 |
|---|---|---|---|
| Cond. (1) | 0.360 | 0.391 | 0.560 |
| Cond. (2) | −3.577 | −3.721 | −3.309 |
| Cond. (3) | 2.684 | 2.535 | 2.156 |
| Cond. (4) | −0.750 | −0.681 | −0.651 |
| Cond. (5) | — | — | 94.96 |

| | Embod. 4 | Embod. 5 | Embod. 6 |
|---|---|---|---|
| Cond. (1) | 0.360 | 0.450 | 0.560 |
| Cond. (2) | −3.787 | −4.379 | −3.911 |
| Cond. (3) | 2.868 | 2.637 | 2.773 |
| Cond. (4) | −0.757 | −0.602 | −0.709 |
| Cond. (5) | — | — | 94.96 |

As can be understood from Table 19, the first through sixth embodiments satisfy conditions (1) through (4), and the third and sixth embodiments satisfy condition (5). Furthermore, as can be understood from the aberration diagrams, the various aberrations are suitably corrected.

A zoom lens system that is included in the technical scope of the present invention may include additional lens elements or lens groups that do not have any (or negligible) refractive power without diverting from the technical scope of the present invention.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a positive first lens group, a negative second lens group, a positive third lens group, and a positive fourth lens group, in that order from an object side, wherein upon zooming from a short focal length extremity to a long focal length extremity, a distance between said first lens group and said second lens group increases, and a distance between said second lens group and said third lens group decreases, wherein said first lens group includes a positive first sub-lens group which remains at a stationary position with respect to an optical axis direction during a focusing operation, and a positive second sub-lens group which moves in the optical axis direction during the focusing operation, in that order from the object side, and wherein the following conditions are satisfied:

$0.35 < f1b/f1a < 0.57$, and $-4.4 < f1w/f2 < -3.2$, wherein f1$b$ designates a focal length of said second sub-lens group;
f1$a$ designates a focal length of said first sub-lens group;
f1$w$ designates a focal length of said first lens group at the short focal length extremity when said zoom lens system is focused on an object at infinity; and
f2 designates a focal length of said second lens group.

2. The zoom lens system according to claim 1, wherein the following condition is further satisfied:

$2.15 < f1w/fw < 2.88$, wherein fw designates a focal length of the entire said zoom lens system at the short focal length extremity.

3. The zoom lens system according to claim 1, wherein the following condition is further satisfied:

$-0.9 < f2/fw < -0.6$, wherein fw designates a focal length of the entire said zoom lens system at the short focal length extremity.

4. The zoom lens system according to claim 1, wherein said first lens group comprises at least one positive lens element which satisfies the following condition:

$91 < v1$, wherein v1 designates an Abbe number with respect to a d-line of said at least one positive lens element that is provided in said first lens group.

5. The zoom lens system according to claim 1, wherein a distance between said first sub-lens group and said second sub-lens group does not change upon zooming from the short focal length extremity to the long focal length extremity.

6. The zoom lens system according to claim 1, wherein a distance between said first sub-lens group and said second sub-lens group changes upon zooming from the short focal length extremity to the long focal length extremity.

7. An electronic imaging apparatus comprising the zoom lens system according to claim 1.

8. A zoom lens system comprising a positive first lens group, a negative second lens group, a positive third lens group, and a positive fourth lens group, in that order from an object side, wherein upon zooming from a short focal length extremity to a long focal length extremity, a distance between said first lens group and said second lens group increases, and a distance between said second lens group and said third lens group decreases, wherein said first lens group includes a positive first sub-lens group which remains at a stationary position with respect to an optical axis direction during a focusing operation, and a positive second sub-lens group which moves in the optical axis direction during the focusing operation, in that order from the object side, and wherein the following conditions are satisfied:

$0.35 < f1b/f1a < 0.57$, and $2.15 < f1w/fw < 2.88$, wherein f1$b$ designates a focal length of said second sub-lens group;
f1$a$ designates a focal length of said first sub-lens group;
f1$w$ designates a focal length of said first lens group at the short focal length extremity when said zoom lens system is focused on an object at infinity; and
fw designates a focal length of said entire zoom lens system at the short focal length extremity.

9. The zoom lens system according to claim 8, wherein the following condition is further satisfied:

$-0.9 < f2/fw < -0.6$, wherein f2 designates a focal length of said second lens group.

10. The zoom lens system according to claim 8, wherein said first lens group comprises at least one positive lens element which satisfies the following condition:

$91 < v1$, wherein v1 designates an Abbe number with respect to a d-line of said at least one positive lens element that is provided in said first lens group.

11. The zoom lens system according to claim 8, wherein a distance between said first sub-lens group and said second sub-lens group does not change upon zooming from the short focal length extremity to the long focal length extremity.

12. The zoom lens system according to claim 8, wherein a distance between said first sub-lens group and said second sub-lens group changes upon zooming from the short focal length extremity to the long focal length extremity.

13. A zoom lens system comprising a positive first lens group, a negative second lens group, a positive third lens group, and a positive fourth lens group, in that order from an object side, wherein upon zooming from a short focal length extremity to a long focal length extremity, a distance between said first lens group and said second lens group increases, and a distance between said second lens group and said third lens group decreases, wherein said first lens group includes a positive first sub-lens group which remains at a stationary position with respect to an optical axis direction during a focusing operation, and a positive second sub-lens group which moves in the optical axis direction during the focusing operation, in that order from the object side, and wherein the following conditions are satisfied:

$0.35 < f1b/f1a < 0.57$, and $-0.9 < f2/fw < -0.6$, wherein f1$b$ designates a focal length of said second sub-lens group;
f1$a$ designates a focal length of said first sub-lens group;
f2 designates a focal length of said second lens group; and
fw designates a focal length of an entire said zoom lens system at the short focal length extremity.

14. The zoom lens system according to claim 13, wherein said first lens group comprises at least one positive lens element which satisfies the following condition:

$91 < v1$, wherein v1 designates an Abbe number with respect to a d-line of said at least one positive lens element that is provided in said first lens group.

15. The zoom lens system according to claim 13, wherein a distance between said first sub-lens group and said second sub-lens group does not change upon zooming from the short focal length extremity to the long focal length extremity.

16. The zoom lens system according to claim 13, wherein a distance between said first sub-lens group and said second sub-lens group changes upon zooming from the short focal length extremity to the long focal length extremity.

17. A zoom lens system comprising a positive first lens group, a negative second lens group, a positive third lens group, and a positive fourth lens group, in that order from an object side, wherein upon zooming from a short focal length extremity to a long focal length extremity, a distance between said first lens group and said second lens group increases, and a distance between said second lens group and said third lens group decreases, wherein said first lens group includes a positive first sub-lens group which remains at a stationary position with respect to an optical axis direction during a focusing operation, and a positive second sub-lens group which moves in the optical axis direction during the focusing operation, in that order from the object side, and wherein the following condition is satisfied:

$0.35 < f1b/f1a < 0.57$, wherein f1$b$ designates a focal length of said second sub-lens group; and f1$a$ designates a focal length of said first sub-lens group, wherein said first lens group comprises at least one positive lens element which satisfies the following condition:

$91 < \nu1$, wherein $\nu1$ designates an Abbe number with respect to a d-line of said at least one positive lens element that is provided in said first lens group.

18. The zoom lens system according to claim 17, wherein a distance between said first sub-lens group and said second sub-lens group does not change upon zooming from the short focal length extremity to the long focal length extremity.

19. The zoom lens system according to claim 17, wherein a distance between said first sub-lens group and said second sub-lens group changes upon zooming from the short focal length extremity to the long focal length extremity.

* * * * *